US009717084B2

(12) United States Patent
Nishikawa et al.

(10) Patent No.: US 9,717,084 B2
(45) Date of Patent: Jul. 25, 2017

(54) USING DIFFERENT TRANSMISSION TIMINGS IN RADIO COMMUNICATION SYSTEM, USER TERMINAL AND RADIO COMMUNICATION METHOD

(71) Applicant: NTT DOCOMO, INC., Tokyo (JP)

(72) Inventors: Daisuke Nishikawa, Tokyo (JP); Kazuaki Takeda, Tokyo (JP); Satoshi Nagata, Tokyo (JP); Yoshihisa Kishiyama, Tokyo (JP); Tooru Uchino, Tokyo (JP); Yuta Sagae, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 53 days.

(21) Appl. No.: 14/355,585

(22) PCT Filed: Nov. 8, 2012

(86) PCT No.: PCT/JP2012/079023
§ 371 (c)(1),
(2) Date: May 1, 2014

(87) PCT Pub. No.: WO2013/069746
PCT Pub. Date: May 16, 2013

(65) Prior Publication Data
US 2014/0293947 A1    Oct. 2, 2014

(30) Foreign Application Priority Data

Nov. 9, 2011    (JP) ................................. 2011-245992

(51) Int. Cl.
*H04L 27/28*    (2006.01)
*H04W 72/04*    (2009.01)
(Continued)

(52) U.S. Cl.
CPC ......... *H04W 72/0453* (2013.01); *H04L 5/001* (2013.01); *H04W 72/1257* (2013.01)

(58) Field of Classification Search
CPC ..... H04L 5/001; H04L 5/0055; H04L 5/0048; H04L 5/0053; H04L 25/0204;
(Continued)

(56) References Cited

U.S. PATENT DOCUMENTS 8,743,787 B2 * 6/2014 Bostrom ............... H04L 5/0051
370/241
9,131,457 B2 * 9/2015 Nam ...................... H04L 5/0005
(Continued)

FOREIGN PATENT DOCUMENTS

GB    WO 2009156929 A2 * 12/2009    ........... H04L 1/0026

OTHER PUBLICATIONS

International Search Report for corresponding International Application No. PCT/JP2012/079023, mailed Dec. 4, 2012 (1 page).
(Continued)

Primary Examiner — Sai Aung
(74) Attorney, Agent, or Firm — Osha Liang LLP

(57) ABSTRACT

To ensure stable operation of a user terminal even in the case where the user terminal is instructed to transmit uplink signals at different transmission timings with a plurality of component carriers, in a radio communication system provided with a radio base station apparatus that indicates transmission timings of uplink signals for each component carrier, and a user terminal that transmits an uplink signal at a transmission timing set based on transmission timing information indicated from the radio base station apparatus and the like, it is a feature that the radio base station apparatus indicates different transmission timing information in a plurality of component carriers, and that the user terminal avoids simultaneous transmission of uplink signals in the case of performing communications using a plurality of contiguous component carriers.

6 Claims, 17 Drawing Sheets

(51) Int. Cl.
  *H04W 72/12* (2009.01)
  *H04L 5/00* (2006.01)

(58) Field of Classification Search
  CPC ............ H04L 25/0224; H04W 52/346; H04W 56/0005; H04W 74/006
  USPC ......................................... 370/280, 328, 329
  See application file for complete search history.

(56) References Cited

U.S. PATENT DOCUMENTS

| | | | | |
|---|---|---|---|---|
| 2009/0259910 A1* | 10/2009 | Lee | ........................... | H04L 1/18 714/748 |
| 2011/0092201 A1* | 4/2011 | Lindstrom | ............ | H04W 24/10 455/424 |
| 2012/0113831 A1* | 5/2012 | Pelletier | ................ | H04L 5/0058 370/252 |
| 2012/0184206 A1* | 7/2012 | Kim | ...................... | H04L 5/0091 455/9 |
| 2013/0010659 A1* | 1/2013 | Chen | ....................... | H04L 5/001 370/280 |
| 2013/0010711 A1* | 1/2013 | Larsson | ............ | H04W 56/0005 370/329 |
| 2013/0044831 A1* | 2/2013 | Narasimha | .......... | H04W 52/365 375/260 |
| 2013/0058315 A1* | 3/2013 | Feuersanger | ....... | H04W 52/281 370/336 |
| 2013/0121316 A1* | 5/2013 | Skov | ..................... | H04L 5/0007 370/336 |
| 2013/0250925 A1* | 9/2013 | Lohr | ................. | H04W 72/0446 370/336 |
| 2014/0029586 A1* | 1/2014 | Loehr | ............... | H04W 56/0045 370/336 |
| 2014/0056271 A1* | 2/2014 | Ahn | .................... | H04W 52/146 370/329 |
| 2014/0140251 A1* | 5/2014 | Pan | ..................... | H04W 72/048 370/280 |

OTHER PUBLICATIONS

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Acess Network (UTRAN) (Release 7);" Sep. 2006 (57 pages).

Extended European Search Report issued in the counterpart European Patent Application No. 12847258.6, mailed Apr. 24, 2015 (10 pages).

Office Action issued in the counterpart European Patent Application No. 12847258.6, mailed Mar. 21, 2016 (4 pages).

Catt; "Simultaneous transmission of multiple uplink channels in LTE-A Rel-11"; 3GPP TSG RAN WG1 Meeting #67, R1-113721; San Francisco, USA; Nov. 14-18, 2011 (3 pages).

Renesas Mobile Europe Ltd.; "RACH procedure on SCell"; 3GPP TSG-RAN WG2 Meeting #76, R2-115782; San Francisco, USA; Nov. 14-18, 2011 (3 pages).

Alcatel-Lucent, Alcatel-Lucent Shanghai Bell; "Simultaneous transmissions of RACH and PUCCH/PUSCH/SRS"; TSG-RAN WG2#76, R2-116184; San Francisco, USA; Nov. 14-18, 2011 (4 pages).

Office Action issued in the counterpart European Patent Application No. 12847258.6, mailed Sep. 27, 2016 (4 pages).

Office Action issued in the counterpart Russian Patent Application No. 2014121799/07(035224), mailed Jul. 18, 2016 (12 pages).

Search Report issued in the counterpart European Patent Application No. 12847258.6, mailed Mar. 14, 2017 (4 pages).

* cited by examiner

| No. | EARLY CC Subframe N | LATE CC Subframe N-1 | UE OPERATION CANDIDATES |
|---|---|---|---|
| 1 | PUSCH | PUSCH | • SCell PUSCH rate matching<br>• SCell PUSCH puncture<br>• SCell PUSCH drop<br>• SIMULTANEOUS TRANSMISSION |
| 2A | PUSCH | PUCCH | • PUSCH rate matching<br>• PUSCH puncture<br>• PUSCH drop<br>• SIMULTANEOUS TRANSMISSION |
| 2B | PUCCH | PUSCH | • PUSCH rate matching<br>• PUSCH puncture<br>• PUSCH drop<br>• SIMULTANEOUS TRANSMISSION |
| 3 | PUSCH | SRS | • SRS drop<br>• SRS puncture<br>• PUSCH rate matching<br>• PUSCH puncture<br>• PUSCH drop<br>• SIMULTANEOUS TRANSMISSION |
| 4A | PUSCH | PRACH | • PRACH drop<br>• PRACH puncture<br>• PUSCH rate matching<br>• PUSCH puncture<br>• PUSCH drop<br>• SIMULTANEOUS TRANSMISSION |
| 4B | PRACH | PUSCH | • PRACH drop<br>• PRACH puncture<br>• PUSCH rate matching<br>• PUSCH puncture<br>• PUSCH drop<br>• SIMULTANEOUS TRANSMISSION |
| 5A | PUCCH | SRS | • SRS drop<br>• SIMULTANEOUS TRANSMISSION |
| 5B | SRS | PUCCH (@Subframe N) | • SRS drop<br>• SIMULTANEOUS TRANSMISSION |
| 6 | PUCCH | PRACH | • PRACH drop<br>• PRACH puncture<br>• SIMULTANEOUS TRANSMISSION |
| 7A | SRS | PRACH | • PRACH drop<br>• PRACH puncture<br>• SRS drop<br>• SIMULTANEOUS TRANSMISSION |
| 7B | PRACH | SRS | • PRACH drop<br>• PRACH puncture<br>• SRS drop<br>• SIMULTANEOUS TRANSMISSION |

FIG. 4

USING DIFFERENT TRANSMISSION TIMINGS IN RADIO COMMUNICATION SYSTEM, USER TERMINAL AND RADIO COMMUNICATION METHOD

TECHNICAL FIELD

The present invention relates to a radio communication system, user terminal and radio communication method, and more particularly, to a radio communication system, user terminal and radio communication method for enabling simultaneous transmission using multicarrier in uplink to be performed.

BACKGROUND ART

In UMTS (Universal Mobile Telecommunications System) networks, for the purpose of improving spectral efficiency, peak data rates and the like, by adopting HSDPA (High Speed Downlink Packet Access) and HSUPA (High Speed Uplink Packet Access), it is performed exploiting maximum features of the system based on W-CDMA (Wideband Code Division Multiple Access). For the UMTS network, for the purpose of further increasing spectral efficiency and data rates, reducing delay and the like, Long Term Evolution (LTE) has been studied (Non-patent Document 1).

In Release-8 LTE (hereinafter, referred to as Rel. 8-LTE), as distinct from W-CDMA, as a radio access scheme, a scheme based on OFDMA (Orthogonal Frequency Division Multiplexing Access) is used in downlink. Meanwhile, a scheme based on SC-FDMA (Single-Carrier Frequency Division Multiple Access) is used in uplink.

The OFDMA scheme is a multicarrier transmission scheme for dividing a frequency band into a plurality of narrow frequency bands (subcarriers), and mapping data to each subcarrier to perform communications. In this OFDMA scheme, high-speed transmission is achieved by orthogonalizing subcarriers on the frequency axis to arrange densely, and it is expected to increase spectral efficiency.

The SC-FDMA scheme is a single-carrier transmission scheme for dividing the frequency band for each terminal to transmit using different frequency bands among a plurality of terminals. In this SC-FDMA scheme, it is possible to reduce interference between terminals readily and effectively and to further reduce fluctuations in transmission power, and this scheme is thereby preferable from the viewpoints of lower power consumption in the terminal, enlargement of coverage and the like.

In the above-mentioned LTE (Rel. 8-LTE) scheme system (LTE system), using variable bands ranging from 1.4 MHz to 20 MHz, it is possible to achieve transmission rates of maximum 300 Mbps in downlink and about 75 Mbps in uplink. Moreover, in the UMTS network, for the purpose of further increasing the wide-band and high speed, successor systems to LTE have been studied (for example, LTE Advanced (LTE-A)).

In the LTE-A scheme system (LTE-A system), with the aim of further improving spectral efficiency, peak throughput and the like, assignments of frequencies with a wider band than in LTE are studied. Further, in LTE-A, (for example, Rel. 10), it is one of requirements to have backward compatibility with LTE. Therefore, to LTE-A are introduced techniques (carrier aggregation (CA) techniques) for performing communications using a transmission band having a plurality of base frequency blocks (component carriers (CCs)) each having a bandwidth usable in LTE.

PRIOR ART DOCUMENT

Non-Patent Document

[Non-patent Document 1] 3GPP, TR25.912 (V7.1.0), "Feasibility study for Evolved UTRA and UTRAN", September 2006

DISCLOSURE OF INVENTION

Problems to be Solved by the Invention

In addition, in the radio access scheme in uplink of the LTE-A system, it is possible to use a scheme based on Clustered DFTS (Discrete Fourier Transform Spread)-OFDMA with SC-FDMA as described above clustered. The clustered DFTS-OFDMA scheme is a scheme for permitting an assignment of DFT output to non-contiguous subcarriers. In the Clustered DFTS-OFDMA scheme, by permitting the assignment of DFT output to non-contiguous subcarriers, although PAPR (Peak-to-Average Power Ratio) is increased, it is possible to increase the frequency-domain scheduling effect. By using such a Clustered DFTS-OFDMA scheme, simultaneous transmission using multicarrier is allowed in uplink of the LTE-A system. Further, in the LTE-A system (for example, Rel. 11), studied is multiple TAG (Timing Advance Group) for enabling a plurality of transmission timings to be controlled as a parameter (more specifically, TA: Timing Advance) for correcting the transmission timing in uplink. By using this multiple TAG, in carrier aggregation operated in Rel. 11-LTE, it is possible to transmit uplink signals at different transmission timings with a plurality of component carriers (CCs). Therefore, in the above-mentioned simultaneous transmission using multicarrier, it is necessary to consider component carriers with different transmission timings.

The present invention was made in view of such a respect, and it is an object of the invention to provide a radio communication system, user terminal and radio communication method for enabling stable operation of the user terminal to be ensured even in the case where the user terminal is instructed to transmit uplink signals at different transmission timings with a plurality of component carriers.

Means for Solving the Problem

A radio communication system according to the present invention is a radio communication system provided with a radio base station apparatus that indicates transmission timing information of uplink signals for each component carrier, and a user terminal that transmits an uplink signal based on information including the transmission timing information indicated from the radio base station apparatus, and is characterized in that the radio base station apparatus indicates different transmission timing information in a plurality of component carriers, and the user terminal avoids simultaneous transmission of uplink signals in the case of performing communications using a plurality of contiguous component carriers.

A user terminal according to the invention is characterized by comprising a receiving section that receives transmission timing information of uplink signals indicated for each component carrier from a radio base station apparatus, and a determining section that determines transmission of an uplink signal corresponding to a difference between transmission timings of the uplink signals, where in the case of performing communications using a plurality of contiguous component carriers, the user terminal avoids simultaneous transmission of the uplink signals when a difference exists between transmission timings of the uplink signals.

A radio communication method according to the invention is a radio communication method provided with a radio base station apparatus that indicates transmission timing information of uplink signals for each component carrier, and a user terminal that transmits an uplink signal at a transmission timing based on information including the transmission timing information indicated from the radio base station apparatus, and is characterized by having the step of indicating different transmission timing information in a plurality of component carriers from the radio base station apparatus, the step of determining whether or not to perform communications using a plurality of contiguous component carriers in the user terminal, and the step of avoiding simultaneous transmission of uplink signals in the user terminal in the case of performing communications using the plurality of contiguous component carriers.

Advantageous Effect of the Invention

According to the present invention, it is possible to ensure stable operation of a user terminal even in the case where uplink signals are transmitted at different transmission timings with a plurality of component carriers.

BRIEF DESCRIPTION OF DRAWINGS

FIG. 4 is a diagram showing an example of a table for defining operation of a user terminal used in a radio communication method according to the invention;

BEST MODE FOR CARRYING OUT THE INVENTION

As described above, in LTE (Rel 8-LTE), the radio access scheme in uplink is based on the DFTS-OFDMA scheme. Therefore, in order to maintain orthogonality of signals among user terminal UEs, it is necessary to adapt a reception timing of an uplink signal from each user terminal UE in a radio base station apparatus (base station apparatus) eNB. In LTE, TA (Timing Advance) control is introduced to adjust the transmission timing of such a user terminal UE.

In Rel. 8-LTE, a user terminal UE uses one component carrier (CC) in uplink, and therefore, it is sufficient to control one TA for each user terminal UE. In contrast thereto, in LTE-A (Rel. 10-LTE) with introduction of carrier aggregation (CA) in uplink scheduled, it is necessary to control TA (i.e. control the transmission timing) for each CC (or, for each set of CCs) in uplink set on a user terminal UE.

In addition, in CA in uplink in Rel. 10-LTE, since targeted CCs are limited to CCs within a contiguous band (intra-band), TA control for each CC is not supported. On the other hand, in Rel. 11-LTE, to actualize such TA control for each CC, with respect to TA to adjust the transmission timing in uplink, studied is introduction of multiple TAG for enabling a plurality of transmission timings to be controlled.

Figure 1A:
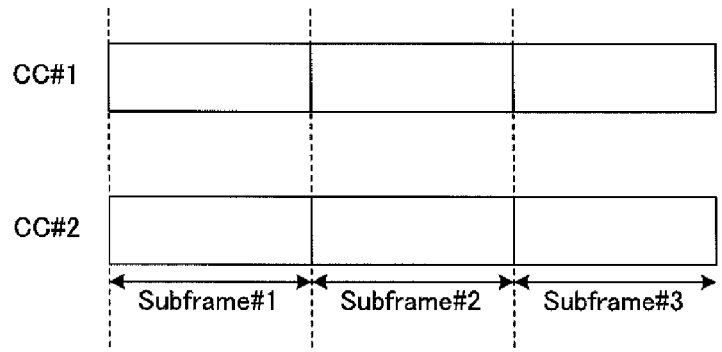
FIG. 1 contains explanatory diagrams of transmission timings of a user terminal in carrier aggregation of Rel 10-LTE and Rel. 11-LTE.
Figure 1B:
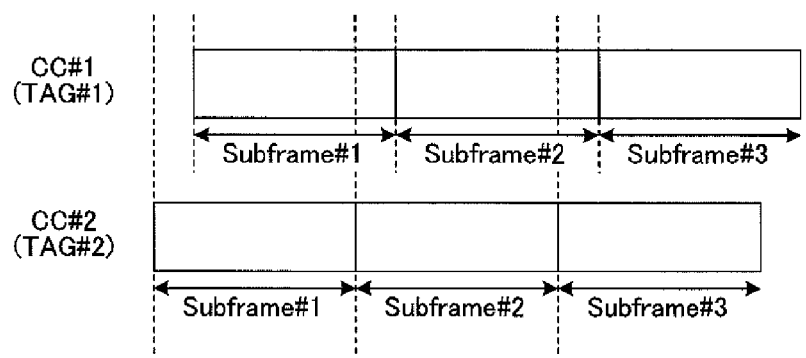

Described below are transmission timings of a user terminal UE in CA of Rel. 10-LTE and Rel. 11-LTE. FIGS. 1A and 1B are explanatory diagrams of transmission timings of a user terminal UE in CA of Rel. 10-LTE and Rel. 11-LTE, respectively. In addition, FIG. 1 shows the case where the user terminal UE transmits uplink signals using two CCs, CC #1 and CC #2.

In CA of Rel. 10-LTE, as described above, since targeted CCs are limited to CCs within a contiguous band (intra-band) and TA control for each CC is not supported, as shown in FIG. 1A, transmission timings are set at the same irrespective of CCs. On the other hand, in CA of Rel. 11-LTE, supported are CA using CCs with non-contiguous bands (inter-band) and also CA between a macro cell and a cell of RRH (Remote Radio Head), and therefore, it is studied to set different (or the same) TA on arbitrary CCs. In this case, as shown in FIG. 1B, transmission timings of the user terminal UE are set at different transmission timings between different CCs.

For example, in CCs with non-contiguous bands (inter-band), since frequency characteristics are different in each CC, for reception at the optimal timing, the need arises for controlling the transmission timing of the user terminal UE individually in each CC. On the other hand, in performing CA between a macro cell and an RRH cell, since positions (more specifically, reception ends of antennas) of antennas are different, the need arises for controlling the transmission timing of the user terminal UE individually in each CC. In CA of Rel. 11-LTE, in order to also support CA in such an environment, the user terminal UE is allowed to transmit uplink signals at different transmission timings between different CCs.

On the other hand, in uplink of Rel. 10-LTE, since the Clustered DFTS-OFDMA scheme is used, simultaneous transmission using multicarrier is permitted. In addition, from the viewpoint of necessity, such simultaneous transmission using multicarrier is limited to simultaneous transmission of parts of uplink channels. More specifically, simultaneous transmission is limited to 1) simultaneous transmission of PUSCH (Physical Uplink Shared Channel) and PUSCH (including simultaneous transmission of SRS (Sounding Reference Signal) and SRS), and 2) simultaneous transmission of PUCCH (Physical Uplink Control Channel) and PUSCH. Simultaneous transmission of the other uplink channels (uplink signals) such as simultaneous transmission of PUSCH and SRS and simultaneous transmission of PUCCH and SRS is not supported.

Figure 2A:
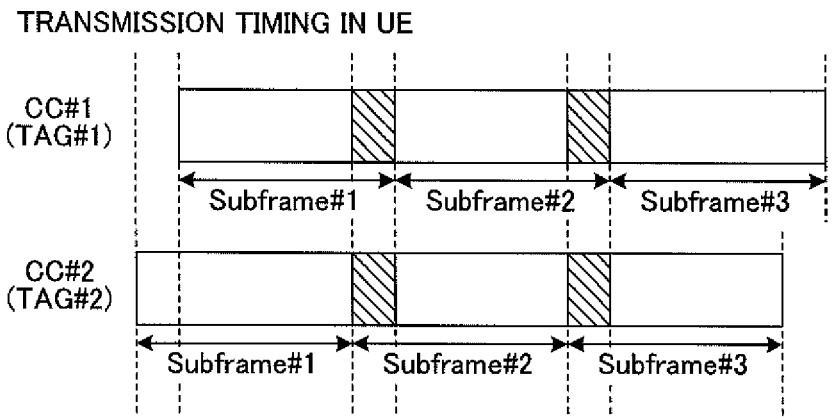
FIG. 2 contains explanatory diagrams of transmission timings of a user terminal in carrier aggregation of Rel 11-LTE.

However, in CA of Rel. 11-LTE, with the introduction of multiple TAG, as shown in FIG. 2A, such a situation may occur that parts of subframes of CCs overlap. FIG. 2A shows the case where the transmission timing in a CC #1 (CC with the transmission timing designated in TAG #1) is set later than the transmission timing of a CC #2 (CC with the transmission timing designated in TAG #2). In this case, a period occurs in which a signal in a rear end portion of a subframe #1 (subframe #2) in the CC #1 overlaps a signal in a front end portion of a subframe #2 (subframe #3) in the CC #2. In addition, as the overlap period, for example, one SC-FDMA symbol is expected.

Figure 2B:
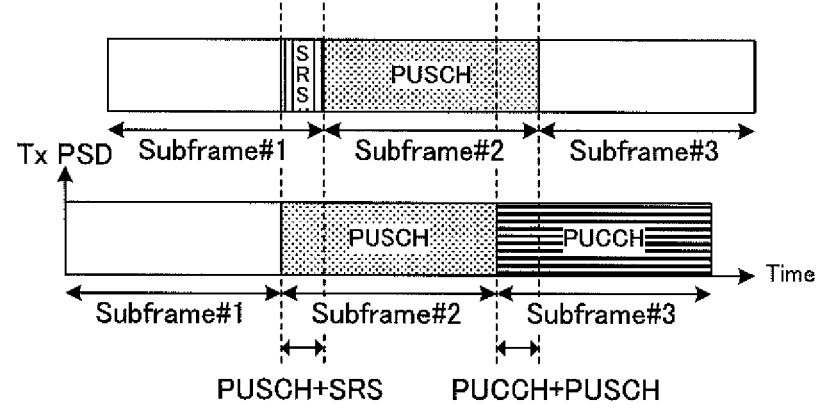

When parts of different subframes overlap between CCs, it is expected that simultaneous transmission occurs between uplink channels that are not supported in Rel. 10-LTE. For example, as shown in FIG. 2B, the occurrence of simultaneous transmission is expected in the SRS assigned to the rear end portion of the subframe #1 in the CC #1 and the PUSCH assigned to the front end portion of the subframe #2 in the CC #2. Further, as shown in FIG. 2B, the occurrence of simultaneous transmission is expected in the PUSCH assigned to the rear end portion of the subframe #2 in the CC #1 and the PUCCH assigned to the front end portion of the subframe #3 in the CC #2.

The occurrence of simultaneous transmission between such uplink channels may result in a situation of not only disturbing operation in the user terminal UE, but also disabling transmission of an uplink signal. The inventors of the present invention noted the point that a contribution is made to the ensuring of stable operation of a user terminal UE by beforehand defining control of the user terminal UE in response to simultaneous transmission between expected uplink channels, while avoiding simultaneous transmission between such uplink channels as much as possible, and arrived at the present invention.

It is the gist of the present invention to ensure stable operation in a user terminal UE by avoiding simultaneous transmission of uplink signals from the user terminal UE in the case of performing communications using a plurality of contiguous component carriers even when different transmission timing information of uplink signals in a plurality of component carriers is received from a base station apparatus eNB. Meanwhile, in the case of performing communications using a plurality of non-contiguous component carriers, by permitting simultaneous transmission of uplink signals within the scope of not inhibiting stable operation of the user terminal UE, a contribution is made to improvements in throughput characteristics in uplink.

Generally, CA is sorted into Intra-band Contiguous CA (hereinafter, simply referred to as Contiguous CA) and Inter-band Non-Contiguous CA (hereinafter, simply referred to as Non-Contiguous CA). The former CA is to perform CA within a contiguous band wider than 20 MHz, and for example, is applied to the case of performing a wideband assignment such as a 3.5 GHz-band. The latter CA is to perform communications using a plurality of carriers with different frequency bands, and for example, is applied to the case of performing communications using two carriers with 2 GHz-band and 800 MHz-band. Further, in the former CA, wideband communications are performed using a single RF (Radio Frequency) unit, and in the latter CA, wideband communications are performed using a plurality of RF units. In addition, Contiguous CA can be called Contiguous transmission, and Non-Contiguous CA can be called Non-Contiguous transmission.

Figure 3:
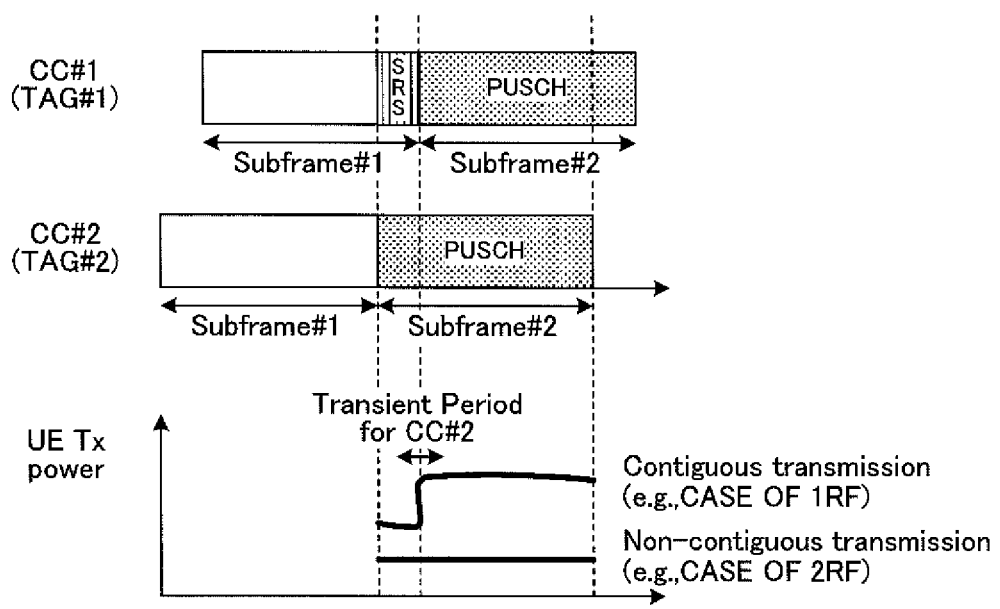
FIG. 3 is an explanatory diagram of a change of transmission power in the case of performing simultaneous transmission in Contiguous CA.

In Contiguous CA, as shown in FIG. 3, when an uplink signal to undergo simultaneous transmission is changed in a subframe, with the change, transmission power varies. The variation period is generally called the transient period. When this transient period occurs in the same subframe, for example, there is the risk of causing problems that signal demodulation accuracy deteriorates in a base station apparatus eNB, and the like. To avoid such a variation in transmission power in a subframe, in a radio communication method according to the present invention, simultaneous transmission is avoided when the overlap occurs in subframes of CCs in Contiguous CA.

On the other hand, in Non-Contiguous CA, since control of transmission power is basically performed between subframes on a CC-by-CC basis, transmission power does not vary in a subframe. Therefore, in the radio communication method according to the invention, simultaneous transmission is permitted when the overlap occurs in subframes of CCs in Non-Contiguous CA.

In addition, when total transmission power required in simultaneous transmission exceeds maximum transmission power in a user terminal UE, the variation period (i.e. transient period) of transmission power may occur in a subframe. In this case, in the radio communication method according to the invention, as in Contiguous CA, simultaneous transmission is avoided, or total transmission power in a subframe is adjusted to a certain transmission power value lower than maximum transmission power. In addition, as a technique of adjusting to a certain transmission power value, such a technique is conceivable that higher transmission power is adjusted to lower transmission power between transmission power used in simultaneous transmission in the case of performing max power scaling described later.

FIG. 4 is a diagram showing an example of a table for defining operation of a user terminal UE used in the radio communication method according to the invention. In FIG. 4 defined are uplink channels with simultaneous transmission designated in subframes of a plurality of (herein, two) CCs set for different transmission timings, and operation (hereinafter, referred to as UE operation) of a user terminal UE in association with combinations of the uplink channels.

More specifically, defined are the uplink channel of which transmission is designated in a subframe N of a CC (for example, CC #2 as shown in FIG. 2) set for early transmission timing, the uplink channel of which transmission is designated in a subframe N−1 of a CC (for example, CC #1 as shown in FIG. 2) set for late transmission timing, and UE operation associated with a combination of the uplink signals. In addition, in the table as shown in FIG. 4, for convenience in description, numbers are assigned corresponding to types of uplink channels designated in both CCs. Each UE operation defined in the table as shown in FIG. 4 will be descried below.

Figure 5:
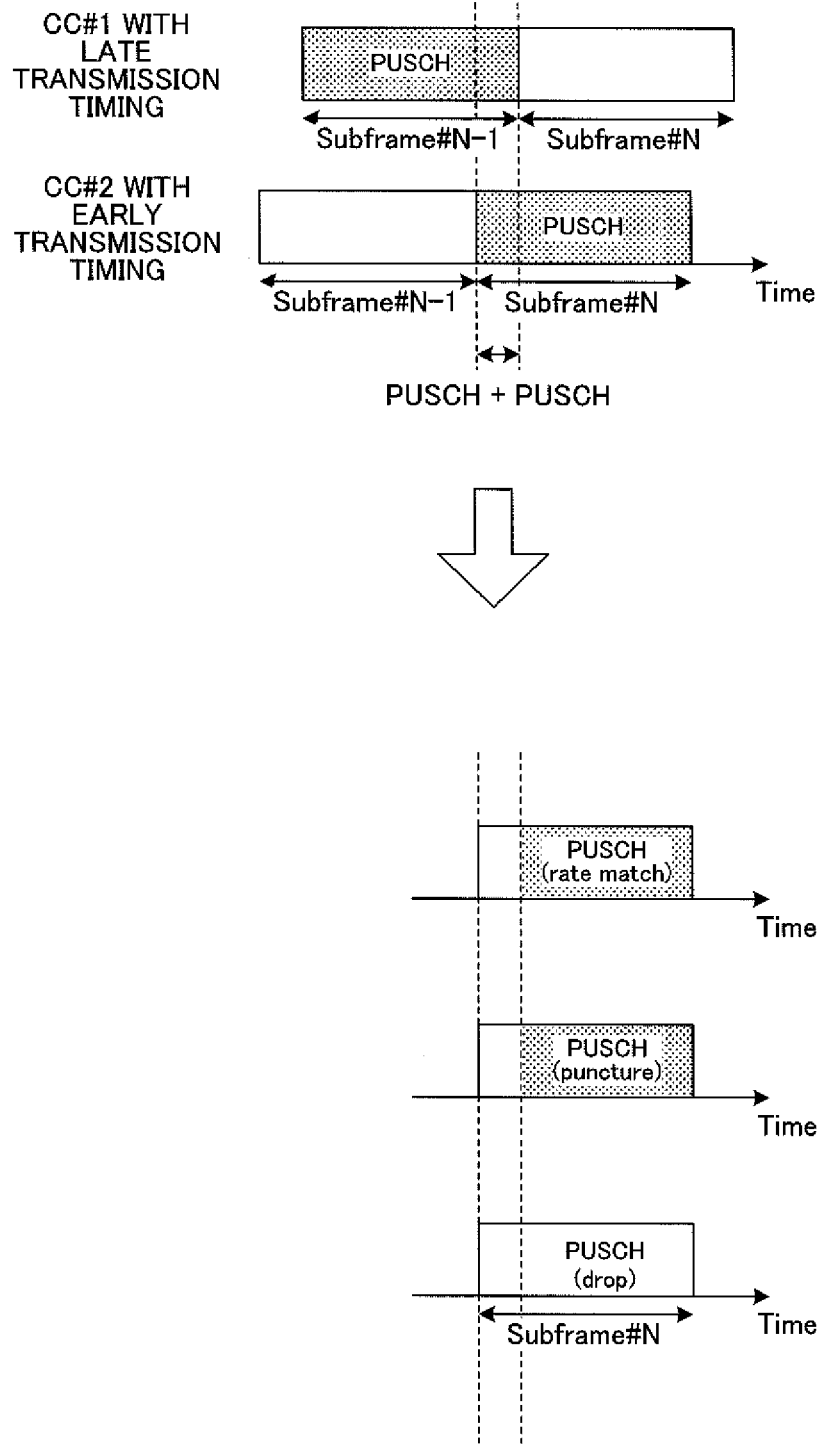
FIG. 5 is an explanatory diagram of UE operation when PUSCHs overlap in subframes of a plurality of CCs.

Described first is UE operation when PUSCHs overlap in subframes of a plurality of CCs (Number 1 as shown in FIG. 4). FIG. 5 is an explanatory diagram of UE operation when PUSCHs overlap in subframes of a plurality of CCs (CC #1 and CC #2). Particularly, FIG. 5 shows UE operation when transmission of the PUSCH is designated in both a subframe N−1 of the CC #1 with late transmission timing and a subframe N of the CC #2 with early transmission timing. FIG. 5 shows the case where the rear end portion of the PUSCH assigned to the subframe N−1 of the CC #1 overlaps the front end portion of the PUSCH assigned to the subframe N of the CC #2.

As UE operation when transmission timings as shown in FIG. 5 are set, with respect to the PUSCH assigned to a secondary cell (SCell), the table as shown in FIG. 4 defines 1) description of performing rate matching (SCell PUSCH rate matching), 2) description of performing puncturing (SCell PUSCH puncture), and 3) description of omitting transmission (SCell PUSCH drop). These kinds of UE operation are selected when Contiguous CA is performed using the CCs as shown in FIG. 5. Further, 4) description of permitting simultaneous transmission (simultaneous transmission) is defined. This UE operation is selected when Non-Contiguous CA is performed using the CCs as shown in FIG. 5.

The case is assumed where Contiguous CA is performed using the CCs as shown in FIG. 5. For example, in the case where the transmission timing in a primary cell (PCell) is later (i.e. the case where the primary cell corresponds to the CC #1), in the radio communication method according to the invention, it is possible to select rate matching or puncturing in the front end portion of the PUSCH of the subframe N of the CC #2 that corresponds to the secondary cell, or transmission omission (drop) of the PUSCH itself. Conversely, in the case where the transmission timing in the primary cell (PCell) is earlier (i.e. the case where the primary cell corresponds to the CC #2), it is possible to select rate matching or puncturing in the rear end portion of the PUSCH of the subframe N of the CC #1 that corresponds to the secondary cell, or transmission omission (drop) of the PUSCH itself. By this means, with respect to portions in which transmission timings overlap in the primary cell and secondary cell, the PUSCH in the primary cell is transmitted without any change, while it is possible to control the PUSCH in the secondary cell not to overlap, and it is possible to avoid simultaneous transmission reliably.

In addition, herein, in consideration of the degree of importance of information transmitted from the user terminal UE, a higher priority is given to information transmission in the primary cell, and information transmission in the secondary cell is controlled. In the case where the primary cell is not included in information transmission (i.e. the case where information transmission is performed only in the secondary cell), a higher priority may be given to the CC including uplink control information (UCI). Further, when the UCI is not included in the secondary cell, a higher priority may be given to a secondary cell set for the same TAG as in the primary cell.

On the other hand, when Non-Contiguous CA is performed using the CCs as shown in FIG. 5, in the radio communication method according to the invention, it is possible to select simultaneous transmission of the PUSCHs in the CC #1 and CC #2. In addition, in the case of performing simultaneous transmission, when max power signaling is required, in the radio communication method according to the invention, according to the specified power scaling rule, transmission power of either or both the PUSCHs is decreased, and total transmission power associated with simultaneous transmission is adjusted to a certain transmission power value below maximum transmission power of the user terminal UE. At this point, by applying the adjusted transmission power to a period during which transmission timings do not overlap so as to make transmission power in the subframe constant, it is possible to reliably prevent a situation in which the transient period occurs in the same subframe.

Figure 6:
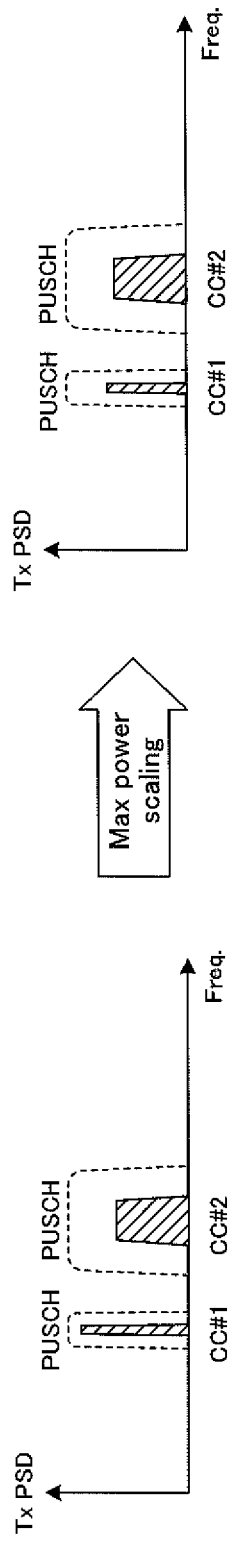
FIG. 6 is a diagram showing an example of max power scaling.

Herein, the max power scaling is referred to as control for decreasing transmission power according to a certain criterion when total transmission power required for information transmission (herein, PUSCH transmission) exceeds total transmission power in the user terminal UE so as to meet maximum transmission power conditions. FIG. 6 is a diagram showing an example of this max power scaling. FIG. 6 shows the case of performing simultaneous transmission of PUSCHs using two CCs, CC #1 and CC #2. In addition, in FIG. 6, the horizontal axis represents the frequency, and the vertical axis represents transmission power.

In FIG. 6, transmission power of the PUSCH assigned to the CC #2 is lower than transmission power of the PUSCH assigned to the CC #1. In addition, it is assumed that total transmission power required for transmission of the PUSCHs exceeds maximum transmission power in the user terminal UE. In this case, in the radio communication method according to the invention, for example, transmission power of the PUSCH assigned to the CC #2 is not changed, transmission power of the PUSCH assigned to the CC #1 is decreased, the level in the entire subframe is matched with the decreased transmission power of the PUSCH of the CC #1, and the transmission power value of the PUSCH of the CC #1 is made constant.

Particularly, in the radio communication method according to the invention, the max power scaling is performed so that following (Eq. 1) holds.

$$P_{PUSCH\_for\_CC\#1} + P_{PUSCH\_for\_CC\#2} \leq P_{CMAX} \quad \text{(Eq. 1)}$$

Herein, $P_{PUSCH\_for\_CC\#1}$ and $P_{PUSCH\_for\_CC\#2}$ represent transmission power of PUSCHs transmitted in the CC #1 and CC #2, respectively. Further, $P_{CMAX}$ represents maximum transmission power in the user terminal UE.

Figure 7A:
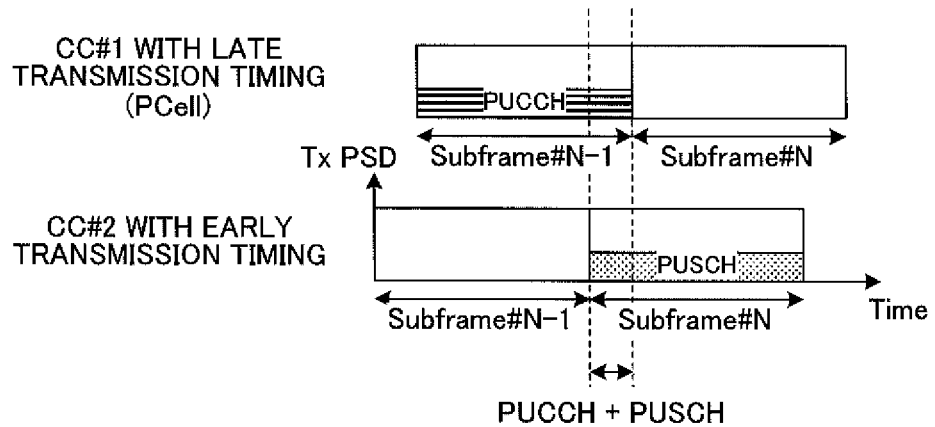
FIG. 7 contains explanatory diagrams of UE operation when PUSCH and PUCCH overlap in subframes of a plurality of CCs.
Figure 7B:
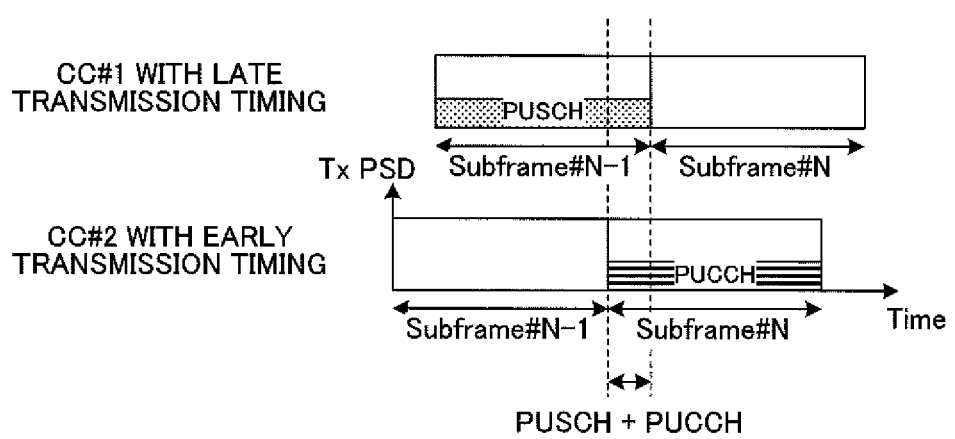

Described next is UE operation when the PUSCH and PUSCH overlap in subframes of a plurality of CCs (Number 2 (2, 2A) as shown in FIG. 4). FIG. 7 contains explanatory diagrams of UE operation when the PUSCH and PUCCH overlap in subframes of a plurality of CCs (CC #1 and CC #2). Particularly, FIG. 7A shows the case where transmission of the PUCCH is designated in a subframe N−1 of the CC #1 with late transmission timing and transmission of the PUSCH is designated in a subframe N of the CC #2 with early transmission timing. Further, FIG. 7B shows the case where transmission of the PUSCH is designated in the subframe N−1 of the CC #1 with late transmission timing and transmission of the PUCCH is designated in the subframe N of the CC #2 with early transmission timing. FIG. 7A shows the case where the rear end portion of the PUCCH assigned to the subframe N−1 of the CC #1 overlaps the front end portion of the PUSCH assigned to the subframe N of the CC #2. FIG. 7B shows the case where the rear end portion of the PUSCH assigned to the subframe N−1 of the CC #1 overlaps the front end portion of the PUCCH assigned to the subframe N of the CC #2.

As UE operation when transmission timings as shown in FIG. 7 are set, with respect to the PUSCH assigned to the secondary cell (SCell), the table as shown in FIG. 4 defines 1) description of performing rate matching (PUSCH rate matching), 2) description of performing puncturing (PUSCH puncture), and 3) description of omitting transmission (PUSCH drop). These kinds of UE operation are selected when Contiguous CA is performed using the CCs as shown in FIG. 7. Further, 4) description of permitting simultaneous transmission (simultaneous transmission) is defined. This UE operation is selected when Non-Contiguous CA is performed using the CCs as shown in FIG. 7. In addition, since the PUCCH is always transmitted in the primary cell, FIG. 4 omits writing of the secondary cell (SCell). The case is assumed where Contiguous CA is performed using the CCs as shown in FIG. 7. For example, as shown in FIG. 7A, in the case where the transmission timing in the primary cell (PCell) is later (i.e. the case where the primary cell corresponds to the CC #1), in the radio communication method according to the invention, it is possible to select rate matching or puncturing in the front end portion of the PUSCH of the subframe N of the CC #2 that corresponds to the secondary cell, or transmission omission (drop) of the PUSCH itself. Conversely, as shown in FIG. 7B, in the case where the transmission timing in the primary cell (PCell) is earlier (i.e. the case where the primary cell corresponds to the CC #2), it is possible to select rate matching or puncturing in the rear end portion of the PUSCH of the subframe N of the CC #1 that corresponds to the secondary cell, or transmission omission (drop) of the PUSCH itself. By this means, with respect to portions in which transmission timings overlap in the primary cell and secondary cell, the PUCCH in the primary cell is transmitted without any change, while it is possible to control the PUSCH in the secondary cell not to overlap, and it is possible to avoid simultaneous transmission reliably.

On the other hand, when Non-Contiguous CA is performed using the CCs as shown in FIG. 7, in the radio communication method according to the invention, it is possible to select simultaneous transmission of the PUSCH and PUCCH in the CC #1 and CC #2. In addition, in the case of performing simultaneous transmission, with respect to control when max power signaling is required, transmission power of the PUSCH is adjusted according to the specified rule. More specifically, transmission power of the PUSCH is decreased so as to meet maximum transmission power, and transmission power in the subframe is made constant with the decreased transmission power. By thus make transmission power in the subframe constant, it is possible to reliably prevent a situation in which the transient period occurs in the same subframe.

Figure 8A:
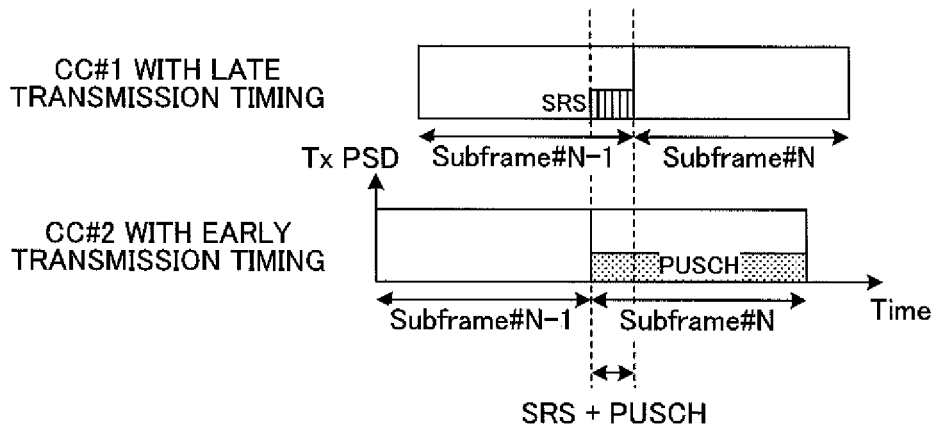
FIG. 8 contains explanatory diagrams of UE operation when SRS and PUSCH overlap in subframes of a plurality of CCs.
Figure 8B:
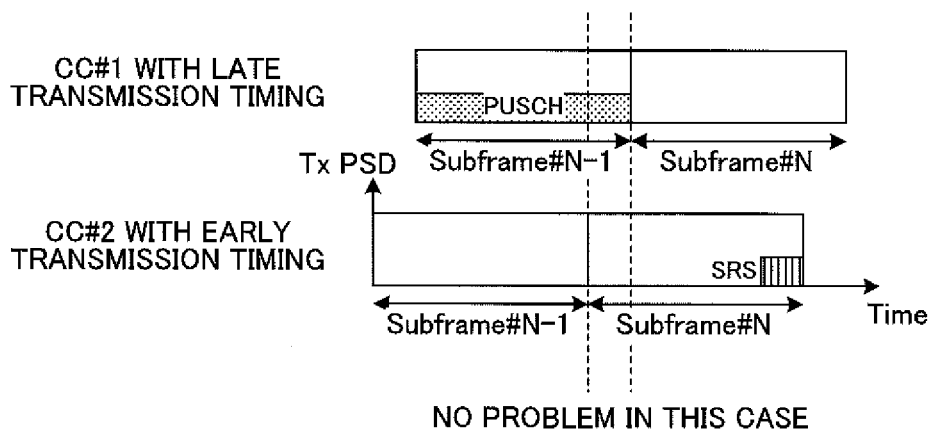

Described next is UE operation when the SRS and PUSCH overlap in subframes of a plurality of CCs (Number 3 as shown in FIG. 4). FIG. 8 contains explanatory diagrams of UE operation when the SRS and PUSCH overlap in subframes of a plurality of CCs (CC #1 and CC #2). Particularly, FIG. 8A shows the case where transmission of the SRS is designated in a subframe N−1 of the CC #1 with late transmission timing and transmission of the PUSCH is designated in a subframe N of the CC #2 with early transmission timing. FIG. 8B shows the case where transmission of the PUSCH is designated in the subframe N−1 of the CC #1 with late transmission timing and transmission of the SRS is designated in the subframe N of the CC #2 with early transmission timing. FIG. 8A shows the case where the SRS assigned to the subframe N−1 of the CC #1 overlaps the front end portion of the PUSCH assigned to the subframe N of the CC #2. In FIG. 8B, the PUSCH assigned to the subframe N−1 of the CC #1 does not overlap the SRS assigned to the subframe N of the CC #2.

As UE operation when transmission timings as shown in FIG. 8A are set, with respect to the SRS assigned to the secondary cell (SCell), the table as shown in FIG. 4 defines 1) description of omitting transmission (SRS drop) and 2) description of performing puncturing (SRS puncture): Further, with respect to the PUSCH assigned to the secondary cell (SCell), the table as shown in FIG. 4 defines 3) performing rate matching (PUSCH rate matching), 4) description of performing puncturing (PUSCH puncture), and 5) description of omitting transmission (PUSCH drop). These kinds of UE operation are selected when Contiguous CA is performed using the CCs as shown in FIG. 8. Further, 6) description of permitting simultaneous transmission (simultaneous transmission) is defined. This UE operation is selected when Non-Contiguous CA is performed using the CCs as shown in FIG. 8.

The case is assumed where Contiguous CA is performed using the CCs as shown in FIG. 8A. For example, in the case where the transmission timing in the primary cell (PCell) is later (i.e. the case where the primary cell corresponds to the CC #1), in the radio communication method according to the invention, it is possible to select rate matching or puncturing in the front end portion of the PUSCH of the subframe N of the CC #2 that corresponds to the secondary cell, or transmission omission (drop) of the PUSCH itself. On the other hand, in the case where the transmission timing in the primary cell (PCell) is earlier (i.e. the case where the primary cell corresponds to the CC #2), it is possible to select transmission omission (drop) of the SRS itself of the subframe N of the CC #1 that corresponds to the secondary cell, or puncturing of the SRS. By this means, with respect to portions in which transmission timings overlap in the primary cell and secondary cell, the SRS or PUSCH in the primary cell is transmitted without any change, while it is possible to control the SRS or PUSCH in the secondary cell not to overlap, and it is possible to avoid simultaneous transmission reliably.

In addition, described herein is the case of controlling transmission of the SRS or PUSCH assigned to the secondary cell (SCell). However, in controlling transmission of the SRS or PUSCH, irrespective of which CC the primary cell corresponds to, transmission of the SRS or PUSCH may always be controlled.

On the other hand, when Non-Contiguous CA is performed using the CCs as shown in FIG. 8A, in the radio communication method according to the invention, it is possible to select simultaneous transmission of the SRS and PUSCH in the CC #1 and CC #2. In addition, in the case of performing simultaneous transmission, with respect to control when max power signaling is required, transmission power of the SRS or PUSCH is adjusted. More specifically, transmission power of either or both of the SRS and PUSCH is decreased so as to meet maximum transmission power, and transmission power in the subframe in each CC is made constant by matching with the decreased transmission power. By thus make transmission power in the subframe constant, it is possible to reliably prevent a situation in which the transient period occurs in the same subframe.

Figure 9A:
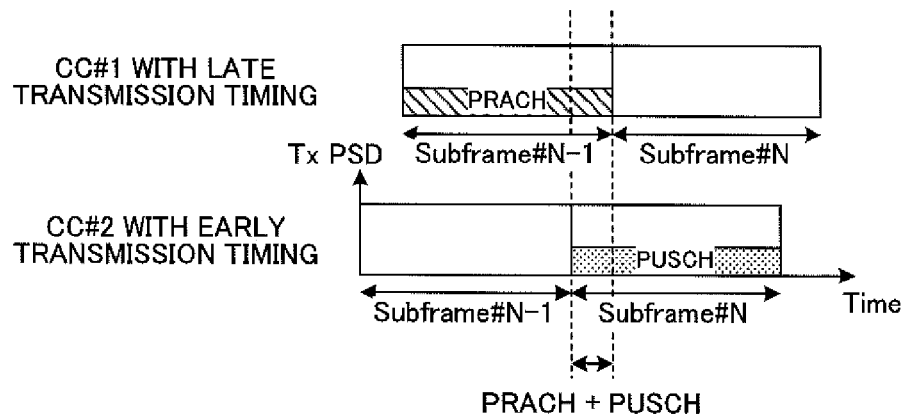
FIG. 9 contains explanatory diagrams of UE operation when PRACH and PUSCH overlap in subframes of a plurality of CCs.
Figure 9B:
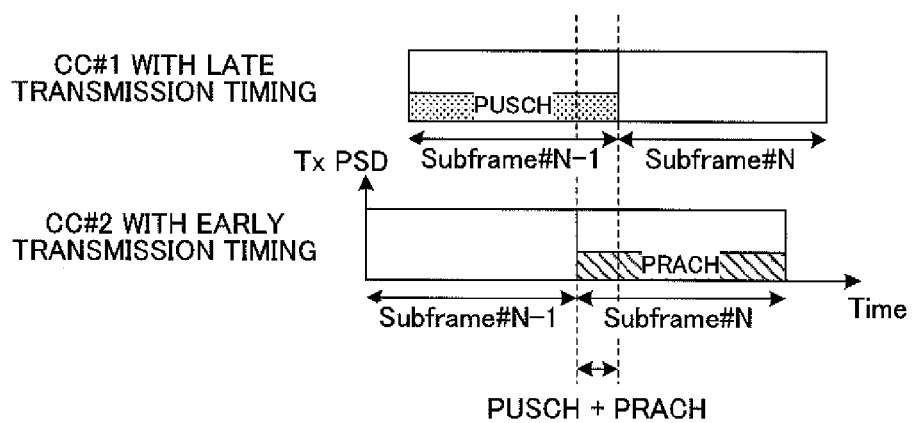

Described next is UE operation when the PRACH and PUSCH overlap in subframes of a plurality of CCs (Number 4 (4A, 4B) as shown in FIG. 4). FIG. 9 contains explanatory diagrams of UE operation when the PRACH and PUSCH overlap in subframes of a plurality of CCs (CC #1 and CC #2). Particularly, FIG. 9A shows the case where transmission of the PRACH is designated in a subframe N−1 of the CC #1 with late transmission timing and transmission of the PUSCH is designated in a subframe N of the CC #2 with early transmission timing. FIG. 9B shows the case where transmission of the PUSCH is designated in the subframe N−1 of the CC #1 with late transmission timing and transmission of the PRACH is designated in the subframe N of the CC #2 with early transmission timing. FIG. 9A shows the case where the rear end portion of the PRACH assigned to the subframe N−1 of the CC #1 overlaps the front end portion of the PUSCH assigned to the subframe N of the CC #2. FIG. 9B shows the case where the rear end portion of the PUSCH assigned to the subframe N−1 of the CC #1 overlaps the front end portion of the PRACH assigned to the subframe N of the CC #2.

As UE operation when transmission timings as shown in FIG. 9 are set, with respect to the PRACH assigned to the secondary cell (SCell), the table as shown in FIG. 4 defines 1) description of omitting transmission (PRACH drop) and 2) description of performing puncturing (PRACH puncture). Further, with respect to the PUSCH assigned to the secondary cell (SCell), the table as shown in FIG. 4 defines 3) performing rate matching (PUSCH rate matching), 4) description of performing puncturing (PUSCH puncture), and 5) description of omitting transmission (PUSCH drop). These kinds of UE operation are selected when Contiguous CA is performed using the CCs as shown in FIG. 9. Further, 6) description of permitting simultaneous transmission (simultaneous transmission) is defined. This UE operation is selected when Non-Contiguous CA is performed using the CCs as shown in FIG. 9.

The case is assumed where Contiguous CA is performed using the CCs as shown in FIG. 9A. For example, in the case where the transmission timing in the primary cell (PCell) is later (i.e. the case where the primary cell corresponds to the CC #1), in the radio communication method according to the invention, it is possible to select rate matching or puncturing in the front end portion of the PUSCH of the subframe N of the CC #2 that corresponds to the secondary cell, or transmission omission (drop) of the PUSCH itself. On the other hand, in the case where the transmission timing in the primary cell (PCell) is earlier (i.e. the case where the primary cell corresponds to the CC #2), it is possible to select transmission omission (drop) of the PRACH itself of the subframe N−1 of the CC #1 that corresponds to the secondary cell, or puncturing in the rear end portion of the PRACH.

The case is assumed where Contiguous CA is performed using the CCs as shown in FIG. 9B. For example, in the case where the transmission timing in the primary cell (PCell) is later (i.e. the case where the primary cell corresponds to the CC #1), in the radio communication method according to the invention, it is possible to select transmission omission (drop) of the PRACH itself of the subframe N of the CC #2 that corresponds to the secondary cell, or puncturing in the front end portion of the PRACH. On the other hand, in the case where the transmission timing in the primary cell (PCell) is earlier (i.e. the case where the primary cell corresponds to the CC #2), it is possible to select rate matching or puncturing in the rear end portion of the PUSCH of the subframe N−1 of the CC #1 that corresponds to the secondary cell, or transmission omission (drop) of the PUSCH itself. By this means, with respect to portions in which transmission timings overlap in the primary cell and secondary cell, the PRACH or PUSCH in the primary cell is transmitted without any change, while it is possible to control the PRACH or PUSCH in the secondary cell not to overlap, and it is possible to avoid simultaneous transmission reliably.

In addition, described herein is the case of controlling transmission of the PRACH or PUSCH assigned to the secondary cell (SCell). However, in controlling transmission of the PRACH or PUSCH, irrespective of which CC the primary cell corresponds to, transmission of the PRACH or PUSCH may always be controlled.

On the other hand, when Non-Contiguous CA is performed using the CCs as shown in FIG. 9, in the radio communication method according to the invention, it is possible to select simultaneous transmission of the PRACH and PUSCH in the CC #1 and CC #2. In addition, in the case of performing simultaneous transmission, with respect to control when max power signaling is required, transmission power of the PRACH or PUSCH or both channels is adjusted. More specifically, transmission power of the PRACH or PUSCH is decreased so as to meet maximum transmission power, and transmission power in the subframe is made constant by matching with the decreased transmission power. By thus make transmission power in the subframe constant, it is possible to reliably prevent a situation in which the transient period occurs in the same subframe.

Figure 10A:
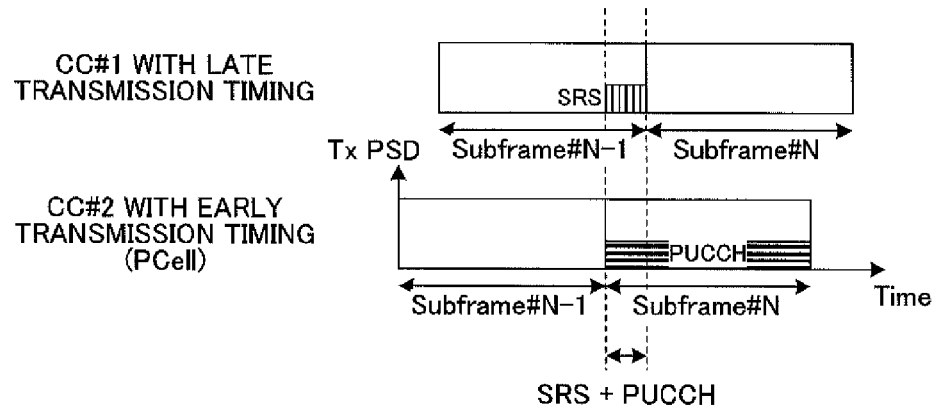
FIG. 10 contains explanatory diagrams of UE operation when PUCCH and SRS overlap in subframes of a plurality of CCs.
Figure 10B:
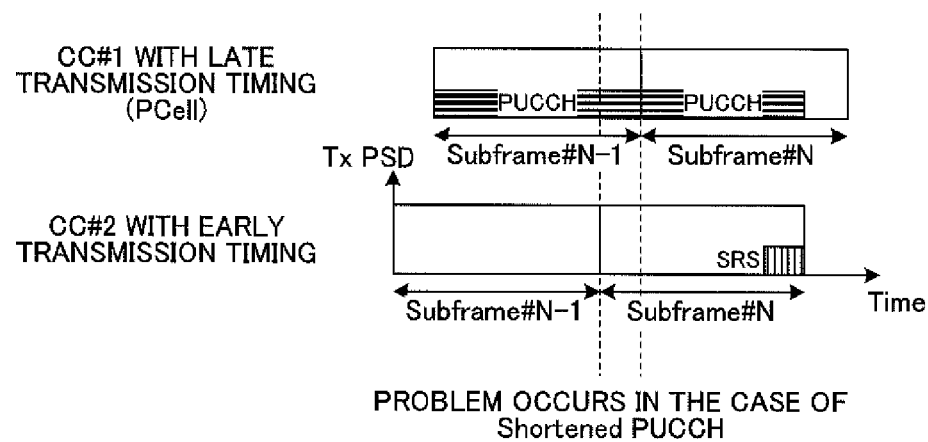

Described next is UE operation when the PUCCH and SRS overlap in subframes of a plurality of CCs (Number 5 (5A, 5B) as shown in FIG. 4). FIG. 10 contains explanatory diagrams of UE operation when the PUCCH and STS overlap in subframes of a plurality of CCs (CC #1 and CC #2). Particularly, FIG. 10A shows the case where transmission of the SRS is designated in a subframe N−1 of the CC #1 with late transmission timing and transmission of the PUCCH is designated in a subframe N of the CC #2 with early transmission timing. FIG. 10B shows the case where transmission of the PUCCH is designated in the subframes N and N−1 of the CC #1 with late transmission timing and transmission of the SRS is designated in the subframe N of the CC #2 with early transmission timing. FIG. 10A shows the case where the SRS assigned to the subframe N−1 of the CC #1 overlaps the front end portion of the PUCCH assigned to the subframe N of the CC #2. FIG. 10B shows the case where the PUCCH assigned to the subframe N of the CC #1 overlaps the SRS assigned to the subframe N of the CC #2.

As UE operation when transmission timings as shown in FIG. 10 are set, the table as shown in FIG. 4 defines 1) description of omitting transmission (SRS drop) of the SRS. This UE operation is selected when Contiguous CA is performed using the CCs as shown in FIG. 10. Further, 2) description of permitting simultaneous transmission (simultaneous transmission) is defined. This UE operation is selected when Non-Contiguous CA is performed using the CCs as shown in FIG. 10.

The case is assumed where Contiguous CA is performed using the CCs as shown in FIG. 10. For example, in the case where the transmission timing in the primary cell (PCell) is earlier (i.e. the case where the primary cell corresponds to the CC #2), in the radio communication method according to the invention, it is possible to select transmission omission (drop) of the SRS itself of the subframe N−1 of the CC #1 that corresponds to the secondary cell. By this means, with respect to portions in which transmission timings overlap in the primary cell and secondary cell, the PUCCH in the primary cell is transmitted without any change, while it is possible to control the SRS in the secondary cell not to overlap, and it is possible to avoid simultaneous transmission reliably.

Similarly, as shown in FIG. 10B, in the case where the transmission timing in the primary cell (PCell) is later (i.e. the case where the primary cell corresponds to the CC #1), in the radio communication method according to the invention, it is possible to select transmission omission (drop) of the SRS itself of the subframe N of the CC #2 that corresponds to the secondary cell.

Conventionally, with respect to simultaneous transmission of the PUCCH and SRS, it has been possible to apply the format (PUCCH shortened format) with a final symbol emptied on the PUCCH. However, in the case where the transmission timing in the primary cell (PCell) is later, the rear end portion of the PUCCH shortened format may overlap the SRS. In consideration of such a situation, the radio communication method according to the invention beforehand defines transmission omission (drop) of the SRS itself of the subframe N of the CC #2 that corresponds to the secondary cell.

On the other hand, when Non-Contiguous CA is performed using the CCs as shown in FIG. 10, in the radio communication method according to the invention, it is possible to select simultaneous transmission of the SRS and PUCCH in the CC #1 and CC #2. In addition, in the case of performing simultaneous transmission, with respect to control when max power signaling is required, transmission power of the SRS is adjusted. More specifically, transmission power of the SRS is decreased so as to meet maximum transmission power.

Figure 11A:
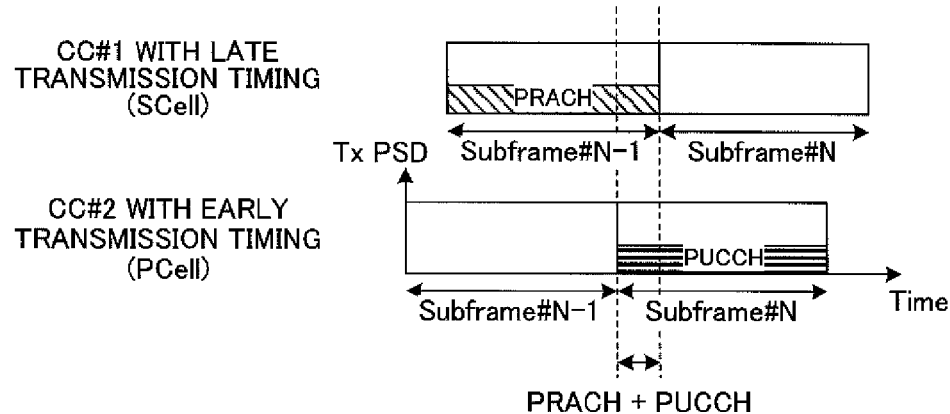
FIG. 11 contains explanatory diagrams of UE operation when PUCCH and PRACH overlap in subframes of a plurality of CCs.
Figure 11B:
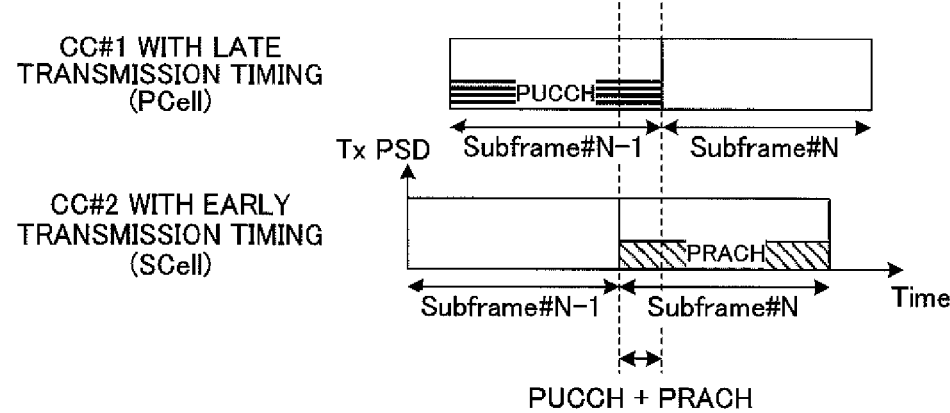

Described next is UE operation when the PUCCH and PRACH overlap in subframes of a plurality of CCs (Number 6 as shown in FIG. 4). FIG. 11 contains explanatory diagrams of UE operation when the PUCCH and PRACH overlap in subframes of a plurality of CCs (CC #1 and CC #2). Particularly, FIG. 11A shows the case where transmission of the PRACH is designated in a subframe N−1 of the CC #1 with late transmission timing and transmission of the PUCCH is designated in a subframe N of the CC #2 with early transmission timing. FIG. 11B shows the case where transmission of the PUCCH is designated in the subframe N−1 of the CC #1 with late transmission timing and transmission of the PRACH is designated in the subframe N of the CC #2 with early transmission timing. FIG. 11A shows the case where the rear end portion of the PRACH assigned to the subframe N−1 of the CC #1 overlaps the front end portion of the PUCCH assigned to the subframe N of the CC #2. FIG. 11B shows the case where the rear end portion of the PUCCH assigned to the subframe N−1 of the CC #1 overlaps the front end portion of the PRACH assigned to the subframe N of the CC #2.

As UE operation when transmission timings as shown in FIG. 11 are set, with respect to the PRACH, the table as shown in FIG. 4 defines 1) description of omitting transmission (PRACH drop) and 2) description of performing puncturing (PRACH puncture). This UE operation is selected when Contiguous CA is performed using the CCs as shown in FIG. 11. Further, 3) description of permitting simultaneous transmission (simultaneous transmission) is defined. This UE operation is selected when Non-Contiguous CA is performed using the CCs as shown in FIG. 11.

The case is assumed where Contiguous CA is performed using the CCs as shown in FIG. 11. For example, as shown in FIG. 11A, in the case where the transmission timing in the primary cell (PCell) is earlier (i.e. the case where the primary cell corresponds to the CC #2), in the radio communication method according to the invention, it is possible to select transmission omission (drop) of the PRACH itself of the subframe N−1 of the CC #2 that corresponds to the secondary cell, or puncturing in the rear end portion of the PRACH.

Similarly, as shown in FIG. 11B, in the case where the transmission timing in the primary cell (PCell) is later (i.e. the case where the primary cell corresponds to the CC #1), in the radio communication method according to the invention, it is possible to select transmission omission (drop) of the PRACH itself of the subframe N−1 of the CC #2 that corresponds to the secondary cell, or puncturing in the front end portion of the PRACH. By this means, with respect to portions in which transmission timings overlap in the primary cell and secondary cell, the PUCCH in the primary cell is transmitted without any change, while it is possible to control the PRACH in the secondary cell not to overlap, and it is possible to avoid simultaneous transmission reliably.

On the other hand, when Non-Contiguous CA is performed using the CCs as shown in FIG. 11, in the radio communication method according to the invention, it is possible to select simultaneous transmission of the PRACH and PUCCH in the CC #1 and CC #2. In addition, in the case of performing simultaneous transmission, with respect to control when max power signaling is required, transmission power of the PRACH is decreased so as to meet maximum transmission power, and transmission power in the subframe is made constant by matching with the decreased transmission power. By thus make transmission power in the subframe constant, it is possible to reliably prevent a situation in which the transient period occurs in the same subframe.

Figure 12A:
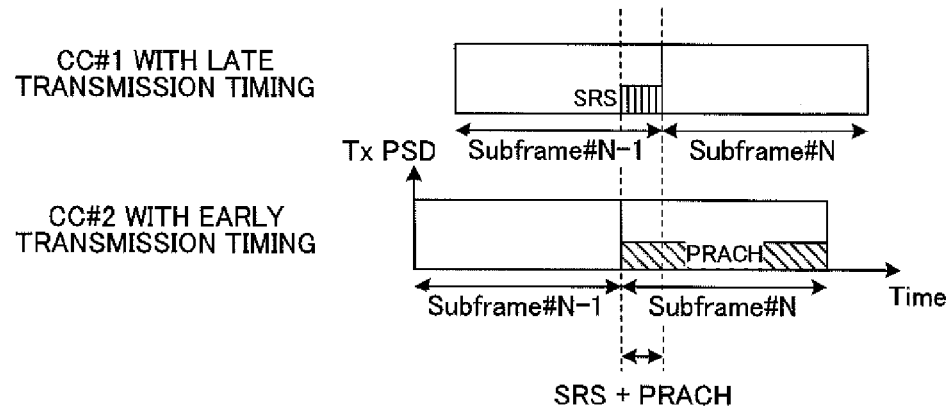
FIG. 12 contains explanatory diagrams of UE operation when SRS and PRACH overlap in subframes of a plurality of CCs.
Figure 12B:
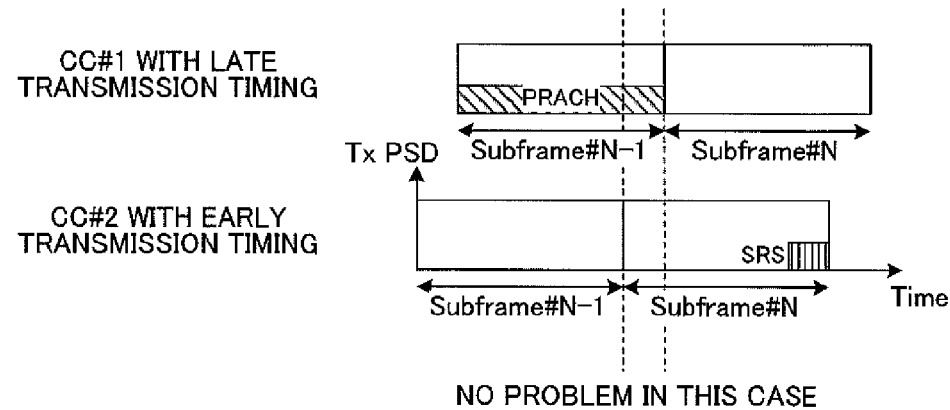

Described next is UE operation when the SRS and PRACH overlap in subframes of a plurality of CCs (Number 7 (7A, 7B) as shown in FIG. 4). FIG. 12 contains explanatory diagrams of UE operation when the SRS and PRACH overlap in subframes of a plurality of CCs (CC #1 and CC #2). Particularly, FIG. 12A shows the case where transmission of the SRS is designated in a subframe N−1 of the CC #1 with late transmission timing and transmission of the PRACH is designated in a subframe N of the CC #2 with early transmission timing. FIG. 12B shows the case where transmission of the PRACH is designated in the subframe N−1 of the CC #1 with late transmission timing and transmission of the SRS is designated in the subframe N of the CC #2 with early transmission timing. FIG. 12A shows the case where the SRS assigned to the subframe N−1 of the CC #1 overlaps the front end portion of the PRACH assigned to the subframe N of the CC #2. In FIG. 12B, the PRACH assigned to the subframe N−1 of the CC #1 does not overlap the SRS assigned to the subframe N of the CC #2.

As UE operation when transmission timings as shown in FIG. 12A are set, with respect to the PRACH, the table as shown in FIG. 4 defines 1) description of omitting transmission (PRACH drop) and 2) description of performing puncturing (PRACH puncture). Further, 3) description of omitting transmission of the SRS (SRS drop) is defined. These kinds of UE operation are selected when Contiguous CA is performed using the CCs as shown in FIG. 12A. Further, 4) description of permitting simultaneous transmission (simultaneous transmission) is defined. This UE operation is selected when Non-Contiguous CA is performed using the CCs as shown in FIG. 12A.

The case is assumed where Contiguous CA is performed using the CCs as shown in FIG. 12A. In this case, in the radio communication method according to the invention, irrespective of which CC the primary cell corresponds to, it is possible to always select transmission omission (drop) of the PRACH itself of the subframe N of the CC #2, or puncturing in the front end portion of the PRACH. Further, in the radio communication method according to the invention, irrespective of which CC the primary cell corresponds to, it is possible to always select transmission omission (drop) of the SRS itself of the subframe N−1 of the CC #1. By this means, with respect to portions in which transmission timings overlap in the primary cell and secondary cell, it is possible to control the PRACH or SRS not to overlap, and it is possible to avoid simultaneous transmission reliably.

On the other hand, when Non-Contiguous CA is performed using the CCs as shown in FIG. 12A, in the radio communication method according to the invention, it is possible to select simultaneous transmission of the SRS and PRACH in the CC #1 and CC #2. In addition, in the case of performing simultaneous transmission, with respect to control when max power signaling is required, transmission power of the SRS or PRACH is adjusted. More specifically, transmission power of the SRS or PRACH or both channels is decreased so as to meet maximum transmission power.

In addition, with respect to the information of CC set for early transmission timing and CC set for late transmission timing, the network NW side may estimate based on the transmitted TA information or the like, or the user terminal UE may report to the network NW side by higher layer signaling.

Described next is an example of a radio base station apparatus (base station apparatus) and mobile station apparatus (mobile station) to which are applied the above-mentioned radio communication method. A radio access system targeted for LTE and LTE-A will be described below as an example, but application to other systems is not limited.

Figure 13:
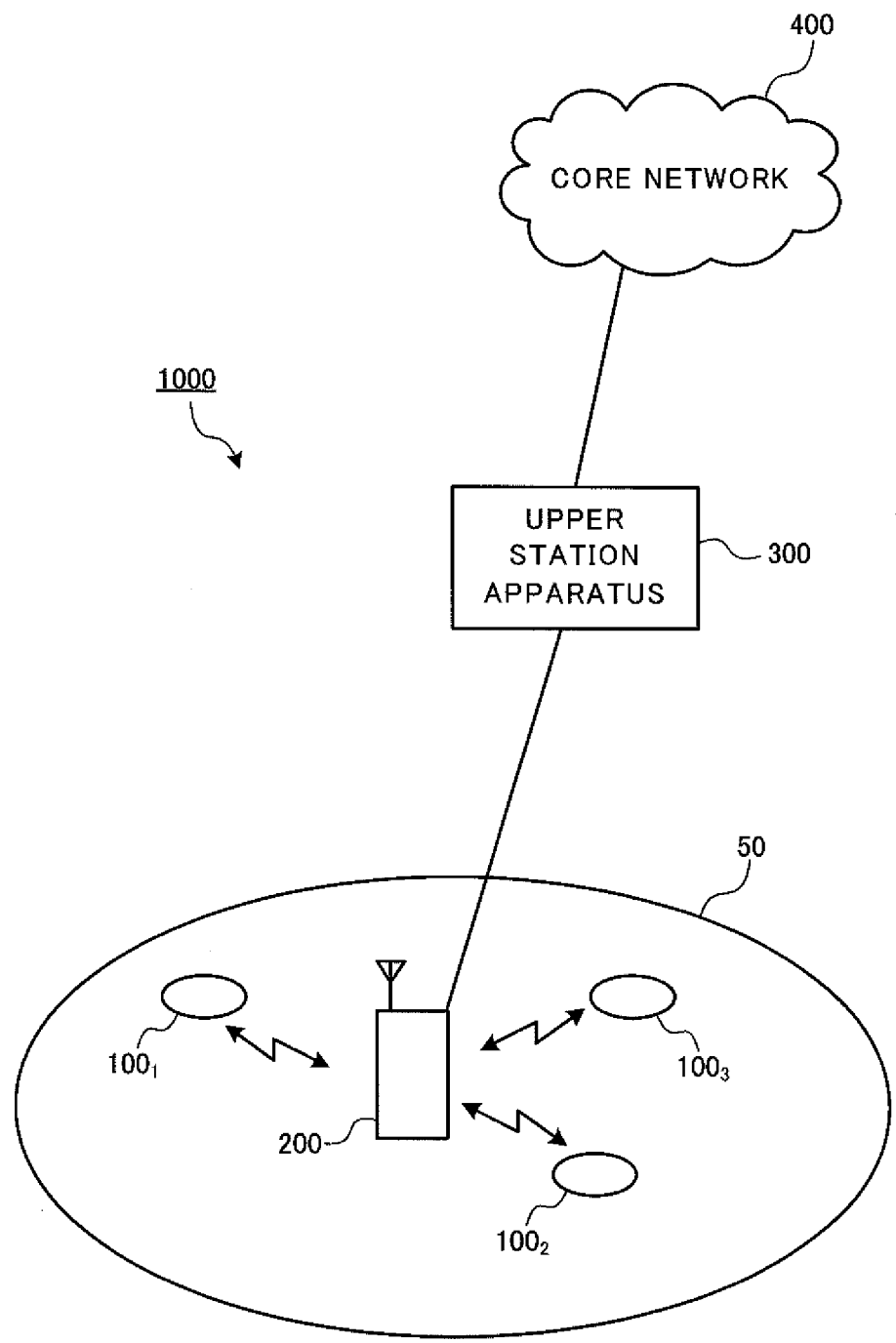
FIG. 13 is an explanatory diagram of a configuration of a radio communication system to which is applied the radio communication method according to the invention.

FIG. 13 is an explanatory diagram of a configuration of a radio communication system to which is applied the radio communication method according to the invention. As shown in FIG. 13, a radio communication system 1000 is based on the LTE system, and is provided with a radio base station apparatus (base station apparatus) 200, and a plurality of mobile terminal apparatuses 100 ($100_1$, $100_2$, $100_3$, . . . , $100_n$, n is an integer where n>0) that communicate with the base station apparatus 200. The base station apparatus 200 is connected to an upper station, for example, an access gateway apparatus 300, and the access gateway apparatus 300 is connected to a core network 400. The mobile terminal apparatus 100n communicates with the base station apparatus 200 in a cell 50 by LTE. In addition, the access gateway apparatus 300 may be called the MME/SGW (Mobility Management Entity/Serving Gateway).

Each of the mobile terminal apparatuses ($100_1$, $100_2$, $100_3$, . . . , $100_n$) has the same configuration, function and state, and is described as a mobile terminal apparatus 100n to proceed with the description unless otherwise specified in the following description. In addition, for convenience in description, equipments that perform radio communications with the base station apparatus are mobile terminal apparatuses, and more generally, may be user equipments (UEs) including mobile terminals and fixed terminals.

In the radio communication system 1000, as a radio access scheme, OFDMA (Orthogonal Frequency Division Multiplexing Access) is applied in downlink, while SC-FDMA (Single Carrier-Frequency Division Multiple Access) is applied in uplink. As described above, OFDMA is a multicarrier transmission scheme for dividing a frequency band into a plurality of narrow frequency bands (subcarriers), and mapping data to each subcarrier to perform communications. SC-FDMA is a single-carrier transmission scheme for dividing the system band into bands comprised of a single or contiguous resource blocks for each terminal so that a plurality of terminals uses mutually different bands, and thereby reducing interference among the terminals.

Described herein are communication channels in the LTE system. In downlink are used reference•signal, Physical Downlink Shared Channel (PDSCH) shared among the mobile terminal apparatuses 100n, and Physical Downlink Control Channel (downlink L1/L2 control channel). CRS, CSI-RS and DM-RS are transmitted using the reference•signal. Signals of user data are transmitted on the Physical Downlink Shared Channel. On the Physical Downlink Control Channel are notified DM-RS sequence information, scheduling information, ID of a user that performs communications using the Physical Downlink Shared Channel, information (i.e. Downlink Scheduling Information) of transport format of the user data, ID of a user that performs communications using the Physical Uplink Shared Channel, information (i.e. Uplink Scheduling Grant) of transport format of the user data, and the like.

Further, in downlink are transmitted broadcast channels such as Physical-Broadcast Channel (P-BCH) and Dynamic-Broadcast Channel (D-BCH). Information transmitted on the P-BCH is Master Information Block (MIB), and information transmitted on the D-BCH is System Information Block (SIB). The D-BCH is mapped to the PDSCH, and is transmitted from the base station apparatus 200 to the mobile terminal apparatus 100n.

In uplink are used the Physical Uplink Shared Channel (PUSCH) shared among the mobile terminal apparatuses 100, and the Physical Uplink Control Channel (PUCCH) that is a control channel in uplink. User data is transmitted on the Physical Uplink Shared Channel. On the Physical Uplink Control Channel are transmitted precoding information for downlink MIMO transmission, transmission acknowledgement information in response to the downlink shared channel, downlink radio quality information (CQI: Channel Quality Indicator), and the like. In addition, the PUSCH can be called the uplink data channel signal, and the PUCCH can be called the uplink control channel signal.

Further, in uplink is defined the Physical Random Access Channel (PRACH) for initial connection and the like. The mobile terminal apparatus 100 transmits a random access preamble on the PRACH. The PRACH can be called the random access channel signal.

Figure 14:
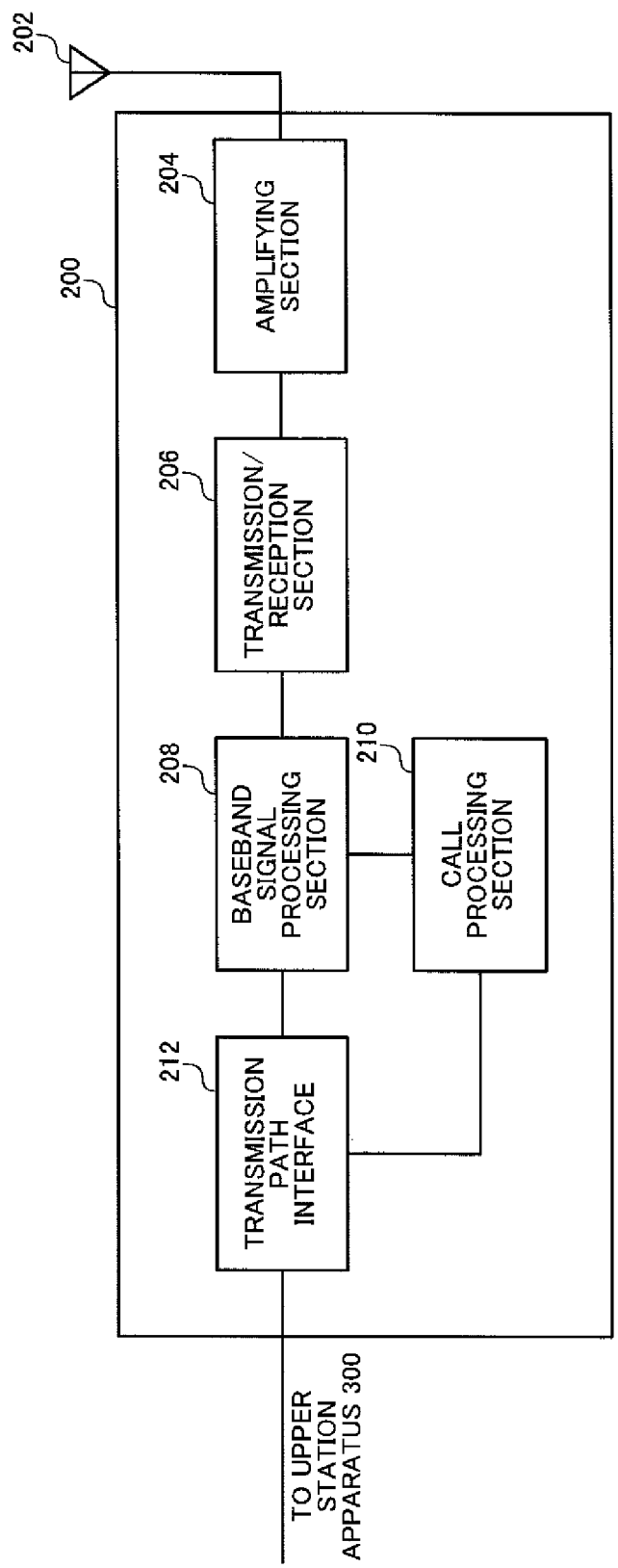
FIG. 14 is a block diagram illustrating a schematic configuration of a radio base station apparatus according to an Embodiment of the invention.

FIG. 14 is a block diagram illustrating a schematic configuration of the radio base station apparatus according to the Embodiment of the invention. The radio base station apparatus 200 as shown in FIG. 14 is mainly comprised of an antenna 202, amplifying section 204, transmission/reception section 206, baseband signal processing section 208, call processing section 210 and transmission path interface 212.

In the radio base station apparatus 200 with such a configuration, with respect to uplink data, a radio frequency signal received in the antenna 202 is amplified in the amplifying section 204 so that reception power is corrected to certain power under AGC (Auto Gain Control). The transmission/reception section 206 frequency-converts the amplified radio frequency signal into a baseband signal. The baseband signal undergoes predetermined processing (error correcting, decoding, etc.) in the baseband signal processing section 208, and then, is transferred to the upper station apparatus 300 via the transmission path interface 212. The call processing section 210 transmits and receives call processing control signals to/from a radio control station of the upper station apparatus 300, and performs status management and resource allocation of the radio base station apparatus 200.

The data in downlink is input to the baseband signal processing section 208 via the transmission path interface 212 from the upper station apparatus 300. The baseband signal processing section 208 performs processing of retransmission control, scheduling, transmission format selection, channel coding and the like to transfer to the transmission/reception section 206. The transmission/reception section 206 frequency-converts the baseband signal output from the baseband signal processing section 208 into a radio frequency signal. The signal subjected to frequency conversion is then amplified in the amplifying section 204, and is transmitted from the antenna 202.

Figure 15:
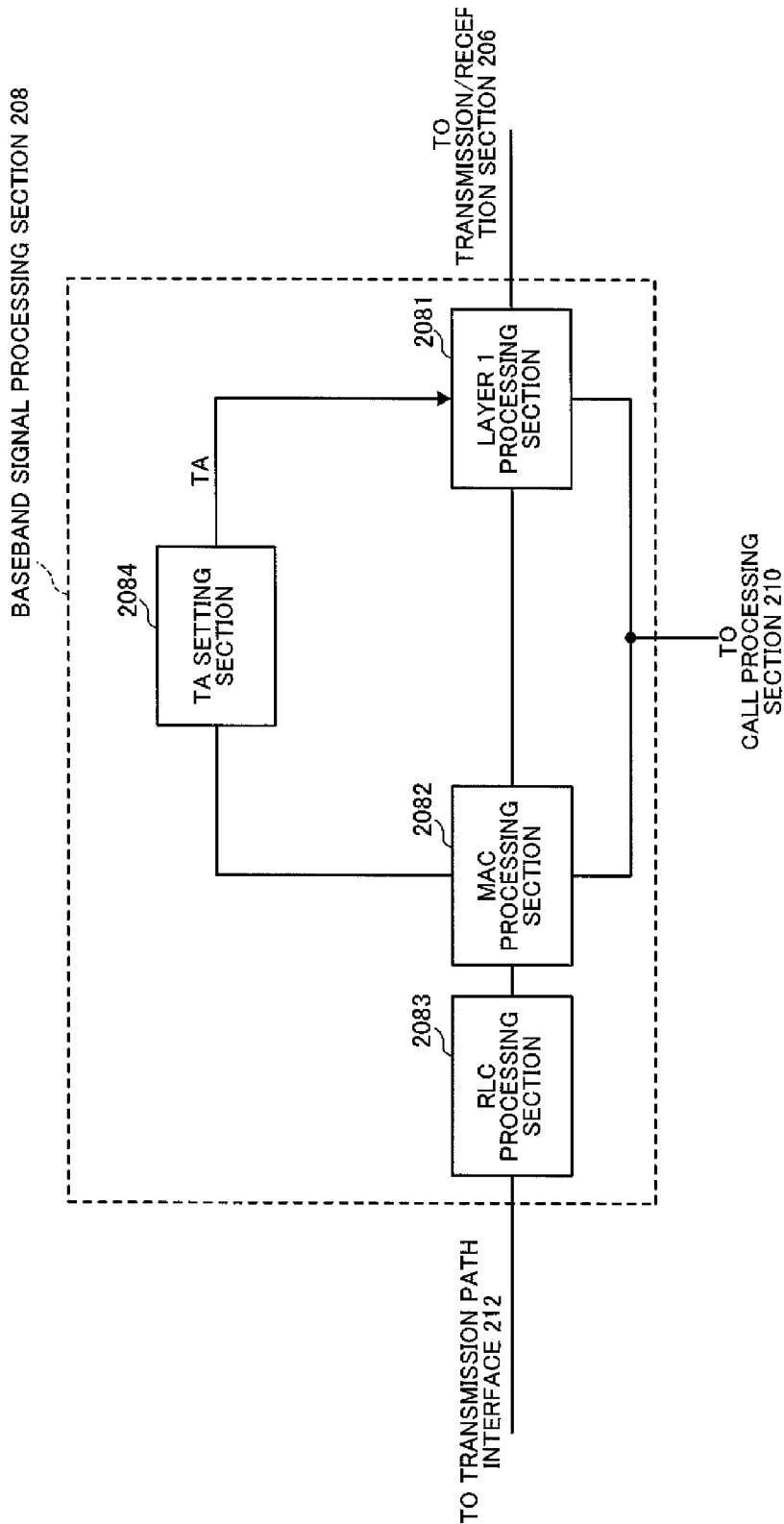
FIG. 15 is a block diagram illustrating a configuration of a baseband signal processing section in the radio base station apparatus as shown in FIG. 14.

FIG. 15 is a block diagram illustrating a configuration of the baseband signal processing section 208 in the radio base station apparatus 200 as shown in FIG. 14. The baseband signal processing section 208 is mainly comprised of a layer 1 processing section 2081, MAC (Medium Access Control) processing section 2082, RLC (Radio Link Control) processing section 2083, and TA setting section 2084.

The layer 1 processing section 2081 mainly performs processing concerning the physical layer. For example, on a signal received in uplink, the layer 1 processing section 2081 performs processing such as channel decoding, Discrete Fourier Transform (DFT) frequency demapping, Inverse Fast Fourier Transform (IFFT), and data demodulation. Further, on a signal to transmit in downlink, the layer 1 processing section 2081 performs processing such as channel coding, data modulation, frequency mapping and Inverse Fast Fourier Transform (IFFT). The MAC processing section 2082 performs processing such as retransmission control in the MAC layer on the signal received in uplink, scheduling in uplink/downlink, selection of a transmission format of PUSCH/PDSCH, and selection of a resource block of PUSCH/PDSCH.

On packets received in uplink and packets to transmit in downlink, the RLC processing section 2083 performs segmentation of packets, concatenation of packets, retransmission control in the RLC layer and the like.

The TA setting section 2084 generates commands (TA commands) set for TA (Time Advance) corresponding to a plurality of CCs. Then, the TA setting section 2084 notifies the layer 1 processing section 2081 of the generated TA commands. The layer 1 processing section 2081 performs processing to transmit the TA commands notified from the layer 1 processing section 2081 in the physical layer to the mobile terminal apparatus 100.

Figure 16:
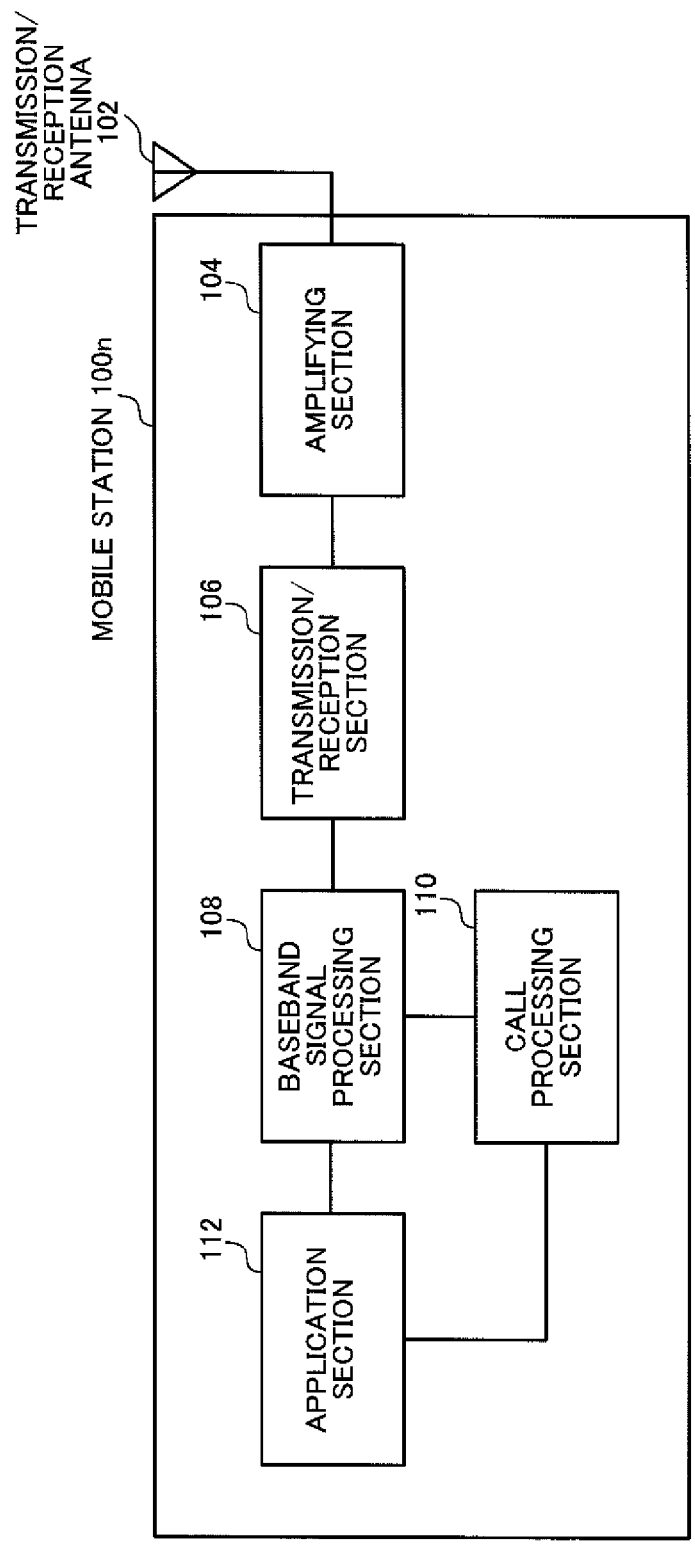
FIG. 16 is a block diagram illustrating a schematic configuration of a mobile terminal apparatus according to the Embodiment of the invention.

FIG. 16 is a block diagram illustrating a schematic configuration of the mobile terminal apparatus 100 according to the Embodiment of the invention. The mobile terminal apparatus 100 as shown in FIG. 16 is mainly comprised of an antenna 102, amplifying section 104, transmission/reception section 106, baseband signal processing section 108, call processing section 110 and application section 112.

In the mobile terminal apparatus 100 with such a configuration, with respect to the data in downlink, a radio frequency signal received in the antenna 102 is amplified in the amplifying section 104 so that reception power is corrected to certain power under AGC. The transmission/reception section 106 frequency-converts the amplified radio frequency signal into a baseband signal. The baseband signal undergoes predetermined processing (error correcting, decoding, etc.) in the baseband signal processing section 108, and then, is output to the call processing section 110 and application section 112. The call processing section 110 performs management of communications with the radio base station apparatus 200, and the application section 112 performs processing concerning layers higher than the physical layer and MAC layer and the like.

The data in uplink is input to the baseband signal processing section 108 from the application section 112. The baseband signal processing section 108 performs processing of retransmission control, scheduling, transmission format selection, channel coding and the like to transfer to the transmission/reception section 106. The transmission/reception section 106 frequency-converts the baseband signal output from the baseband signal processing section 108 into a radio frequency signal. The signal subjected to frequency conversion is then amplified in the amplifying section 104, and is transmitted from the antenna 102.

Figure 17:
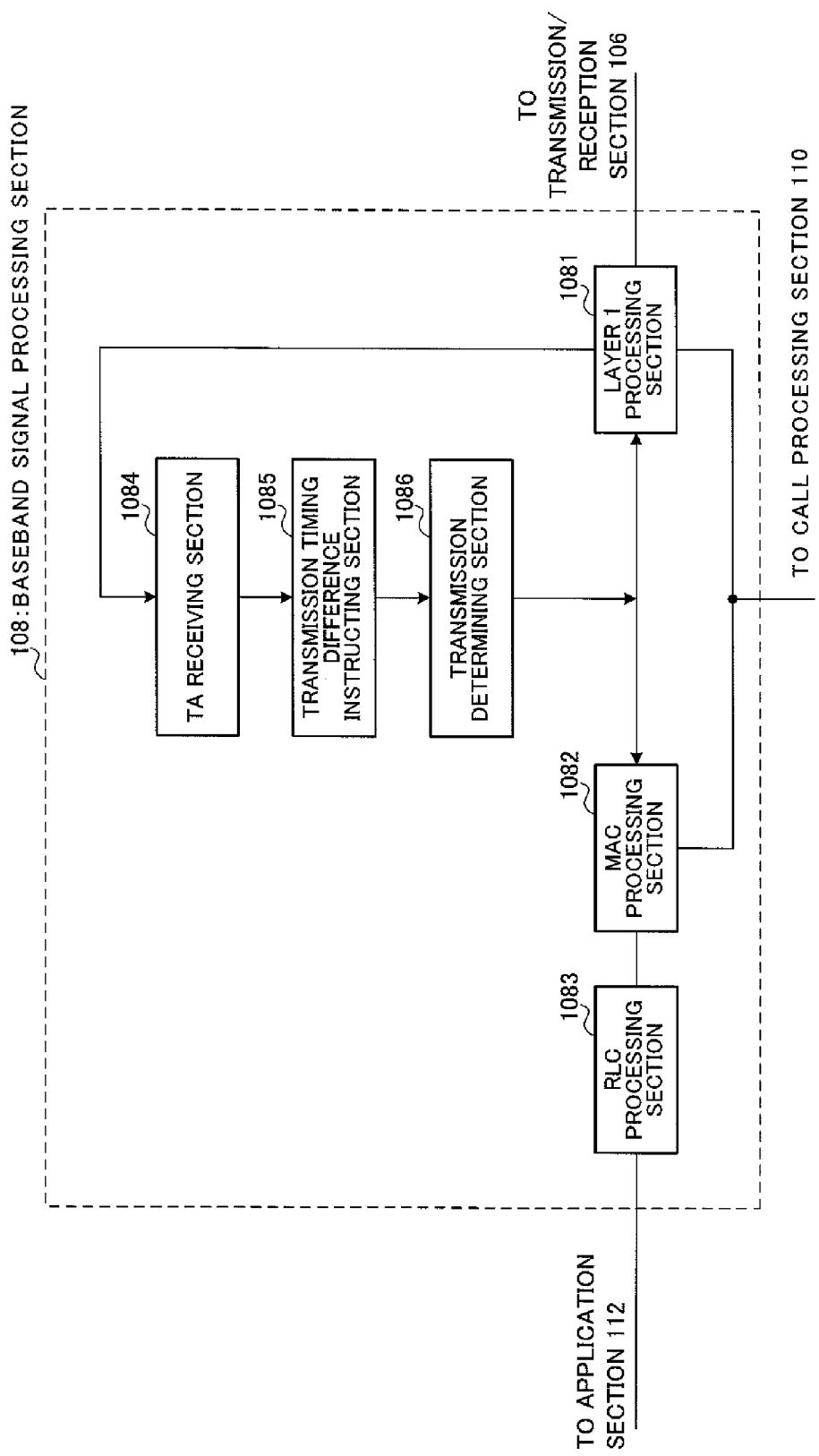
FIG. 17 is a block diagram illustrating a configuration of a baseband signal processing section in the mobile terminal apparatus as shown in FIG. 16.

FIG. 17 is a block diagram illustrating a configuration of the baseband signal processing section 108 in the mobile terminal apparatus 100 as shown in FIG. 16. The baseband signal processing section 108 is mainly comprised of a layer 1 processing section 1081, MAC processing section 1082, RLC processing section 1083, TA receiving section 1084, transmission timing difference instructing section 1085 and transmission determining section 1086. The TA receiving section 1084 constitutes a receiving section in the scope of claims, and the transmission determining section 1086 constitutes a determining section in the scope of claims.

The layer 1 processing section 1081 mainly performs processing concerning the physical layer. For example, on a signal received in downlink, the layer 1 processing section 1081 performs processing such as channel decoding, Discrete Fourier Transform, frequency demapping, Inverse Fast Fourier Transform, and data demodulation. Further, on a signal to transmit in uplink, the layer 1 processing section 1081 performs processing such as channel coding, data modulation, frequency mapping and Inverse Fast Fourier Transform (IFFT).

The MAC processing section 1082 performs retransmission control (HARQ) in the MAC layer on the signal received in downlink, analysis of downlink scheduling information (identification of a transmission format of the PDSCH, identification of a resource block of the PDSCH) and the like. Further, the MAC processing section 1082 performs processing such as MAC retransmission control on a signal to transmit in uplink, and analysis of uplink scheduling information (identification of a transmission format of the PUSCH, identification of a resource block of the PUSCH). On packets received in downlink and packets to transmit in uplink, the RLC processing section 1083 performs segmentation of packets, concatenation of packets, retransmission control in the RLC layer and the like.

The TA receiving section 1084 receives TA (Time Advance) commands corresponding to a plurality of CCs from the radio base station apparatus 200, and detects transmission timing information of an uplink signal in each CC from the TA commands. Then, the TA receiving section 1084 notifies the transmission timing difference instructing section 1085 of the detected transmission timing information of the uplink signal.

The transmission timing difference instructing section 1085 sets the transmission timing of each CC based on a plurality of pieces of TA notified from the TA receiving section 1084, and determines whether the transmission timing of the uplink signal in the CC is early or late. Then, the transmission timing difference instructing section 1085 notifies the transmission determining section 1086 of the determination result.

The transmission determining section 1086 determines the presence or absence of transmission or a signal to transmit according to the descriptions defined in the table as shown in FIG. 4, based on information such as the timing information notified from the transmission timing difference instructing section 1085, transmission signal information for each CC, and simultaneous transmission availability information (Contiguous transmission or Non-Contiguous transmission). Then, the transmission determining section 1086 notifies the layer 1 processing section 1081 of the determination result.

Particularly, in the case of performing communications (Contiguous transmission) using a plurality of contiguous CCs, when a difference exists between transmission timings of uplink signals, the transmission determining section 1086 avoids simultaneous transmission of the uplink signals. On the other hand, in the case of performing communications (Non-Contiguous transmission) using a plurality of non-contiguous CCs, even when a difference exists between transmission timings of uplink signals, the transmission determining section 1086 permits simultaneous transmission of the uplink signals.

Thus, in the mobile terminal apparatus 100, when different transmission timing information of uplink signals in a plurality of CCs is received from the radio base station apparatus 200, the apparatus 100 determines whether to perform Contiguous transmission or Non-Contiguous transmission. Then, when Contiguous transmission is performed, the apparatus 100 avoids simultaneous transmission of uplink signals. By this means, even when the apparatus 100 is instructed to transmit uplink signals at different transmission timings in a plurality of component carriers, it is possible to ensure stable operation of the user terminal. On the other hand, when Non-contiguous transmission is performed, the apparatus 100 permits simultaneous transmission of uplink signals. By this means, it is possible to improve throughput characteristics in uplink.

In the above-mentioned descriptions, the present invention is specifically described using the above-mentioned Embodiment, but it is obvious to a person skilled in the art that the invention is not limited to the Embodiment described in the Description. The invention is capable of being carried into practice as modified and changed aspects without departing from the subject matter and scope of the invention defined by the descriptions of the scope of claims. Accordingly, the descriptions of the Description are intended for illustrative explanation, and do not have any restrictive meaning to the invention.

The present application is based on Japanese Patent Application No. 2011-245992 filed on Nov. 9, 2011, entire content of which is expressly incorporated by reference herein.

The invention claimed is:

1. A user terminal comprising:
a receiver that receives transmission timing information of uplink signals indicated for each component carrier from a radio base station apparatus; and
a processor that determines presence or absence of transmission of an uplink signal or a signal to transmit,
wherein, when physical uplink shared channel (PUSCH) transmission or physical uplink control channel (PUCCH) transmission and sounding reference signal (SRS) transmission overlap in a plurality of component carriers and total transmission power of uplink signals required in simultaneous transmission exceeds maximum transmission power determined in the user terminal, the SRS transmission is dropped.

2. A user terminal comprising:
a receiver that receives transmission timing information of uplink signals indicated for each component carrier from a radio base station apparatus; and
a processor that determines presence or absence of transmission of an uplink signal or a signal to transmit,
wherein, when sounding reference signal (SRS) transmission and random access channel signal transmission overlap in a plurality of component carriers and total transmission power of uplink signals required in simultaneous transmission exceeds maximum transmission power determined in the user terminal, the SRS transmission is dropped.

3. A user terminal comprising:
a receiver that receives transmission timing information of uplink signals indicated for each component carrier from a radio base station apparatus; and
a processor that determines presence or absence of transmission of an uplink signal or a signal to transmit,
wherein, when sounding reference signal (SRS) transmission on a subframe N−1 for a first cell overlaps physical uplink shared channel (PUSCH) transmission on a subframe N for a second cell and the total transmission power of the uplink signals exceeds the maximum transmission power determined in the user terminal, the SRS transmission is dropped.

4. The user terminal according to claim 3, wherein the first cell and the second cell belong to mutually different Timing Advance Group (TAGs).

5. A radio communication system comprising:
a radio base station apparatus that indicates transmission timing information of uplink signals for each component carrier; and
a user terminal that transmits an uplink signal based on information including the transmission timing information indicated from the radio base station apparatus,
wherein the radio base station apparatus indicates different transmission timing information in a plurality of component carriers,
when total transmission power of uplink signals required in simultaneous transmission exceeds maximum transmission power determined in the user terminal, the user terminal avoids simultaneous transmission of the uplink signals, and
the user terminal drops sounding reference signal (SRS) transmission when:
(i) physical uplink shared channel (PUSCH) transmission or physical uplink control channel (PUCCH) transmission and the SRS transmission overlap in a plurality of component carriers;
(ii) the SRS transmission and random access channel signal transmission overlap in a plurality of component carriers; or
(iii) the SRS transmission on a subframe N−1 for a first cell overlaps PUSCH transmission on a subframe N for a second cell and the total transmission power of the uplink signals exceeds the maximum transmission power determined in the user terminal.

6. A radio communication method provided with a radio base station apparatus that indicates transmission timing information of uplink signals for each component carrier, and a user terminal that transmits an uplink signal at a transmission timing set based on information including the transmission timing information indicated from the radio base station apparatus, the radio communication method comprising the steps of:

in the radio base station apparatus, indicating different transmission timing information in a plurality of component carriers; and in the user terminal, when total transmission power of uplink signals to undergo simultaneous transmission exceeds maximum transmission power determined in the user terminal, avoiding simultaneous transmission of the uplink signals, wherein the user terminal drops sounding reference signal (SRS) transmission when:
- (i) physical uplink shared channel (PUSCH) transmission or physical uplink control channel (PUCCH) transmission and the SRS transmission overlap in a plurality of component carriers;
- (ii) the SRS transmission and random access channel signal transmission overlap in a plurality of component carriers; or
- (iii) the SRS transmission on a subframe N−1 for a first cell overlaps PUSCH transmission on a subframe N for a second cell and the total transmission power of the uplink signals exceeds the maximum transmission power determined in the user terminal.

* * * * *